United States Patent
Kawai

(10) Patent No.: US 12,210,269 B2
(45) Date of Patent: *Jan. 28, 2025

(54) ACCESSORY

(71) Applicant: NIKON CORPORATION, Tokyo (JP)

(72) Inventor: Akihiko Kawai, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 17/750,675

(22) Filed: May 23, 2022

(65) Prior Publication Data

US 2022/0283481 A1 Sep. 8, 2022

Related U.S. Application Data

(62) Division of application No. 16/512,747, filed on Jul. 16, 2019, now Pat. No. 11,366,373.

(30) Foreign Application Priority Data

Jul. 18, 2018 (JP) ................................ 2018-135122

(51) Int. Cl.
*G03B 17/14* (2021.01)
*G03B 5/02* (2021.01)
*G03B 5/04* (2021.01)
*G03B 13/34* (2021.01)

(52) U.S. Cl.
CPC ................ *G03B 17/14* (2013.01); *G03B 5/02* (2013.01); *G03B 5/04* (2013.01); *G03B 13/34* (2013.01)

(58) Field of Classification Search
CPC . G03B 17/14; G03B 5/02; G03B 5/04; G03B 13/34
See application file for complete search history.

(56) References Cited

U.S. PATENT DOCUMENTS

| 7,742,693 B2 | 6/2010 | Kobayashi |
| 8,374,499 B2 | 2/2013 | Sakamoto |
| 9,151,929 B2 | 10/2015 | Hasegawa et al. |
| 10,911,665 B2 | 2/2021 | Kawai |

(Continued)

FOREIGN PATENT DOCUMENTS

| CN | 105866917 A | 8/2016 |
| JP | 2002-152576 A | 5/2002 |

(Continued)

OTHER PUBLICATIONS

Feb. 7, 2023 Office Action issued in Japanese Patent Application No. 2019-124709.

(Continued)

*Primary Examiner* — Clayton E. LaBalle
*Assistant Examiner* — Diana Hancock
(74) *Attorney, Agent, or Firm* — Oliff PLC

(57) ABSTRACT

A camera body, to which an accessory is mountable, includes a first communicator that transmits a first clock signal to the accessory to communicate with the accessory in synchronization with the first clock signal, and a second communicator that receives a second clock signal output from the accessory to communicate with the accessory in synchronization with the second clock signal. A value specifying a communication specification of the second communicator is transmitted between the first communicator and the accessory.

10 Claims, 10 Drawing Sheets

| BODY / LENS | FIRST GENERATION | SECOND GENERATION | THIRD GENERATION | FOURTH GENERATION |
|---|---|---|---|---|
| FIRST GENERATION ONLY | FIRST GENERATION | FIRST GENERATION | FIRST GENERATION | FIRST GENERATION |
| SECOND GENERATION ONLY | NORMAL OPERATION NOT EXECUTED | SECOND GENERATION | SECOND GENERATION | SECOND GENERATION |
| THIRD GENERATION ONLY | NORMAL OPERATION NOT EXECUTED | NORMAL OPERATION NOT EXECUTED | THIRD GENERATION | THIRD GENERATION |
| FOURTH GENERATION ONLY | NORMAL OPERATION NOT EXECUTED | NORMAL OPERATION NOT EXECUTED | NORMAL OPERATION NOT EXECUTED | FOURTH GENERATION |

(56) References Cited

U.S. PATENT DOCUMENTS

| | | | |
|---|---|---|---|
| 11,054,724 | B2 | 7/2021 | Kawai |
| 11,212,430 | B2 | 12/2021 | Kawai |
| 11,353,778 | B2 * | 6/2022 | Kawai .................. G03B 5/04 |
| 11,366,373 | B2 * | 6/2022 | Kawai .................. G03B 17/14 |
| 2011/0044682 | A1 | 2/2011 | Kawanami |
| 2012/0327267 | A1 | 12/2012 | Takahara |
| 2014/0184893 | A1 | 7/2014 | Imafuji |
| 2015/0116592 | A1 | 4/2015 | Suzuki |
| 2015/0215515 | A1 | 7/2015 | Isono et al. |
| 2016/0127644 | A1 | 5/2016 | Kawanami |
| 2018/0081148 | A1 * | 3/2018 | Tomita ................ H04N 23/51 |
| 2018/0352122 | A1 | 12/2018 | Yasuda et al. |
| 2018/0352141 | A1 * | 12/2018 | Saito ................... H04N 23/55 |
| 2019/0037127 | A1 * | 1/2019 | Kawada .............. H04N 23/651 |
| 2019/0373178 | A1 * | 12/2019 | Ichinose .............. G02B 7/102 |
| 2020/0026155 | A1 | 1/2020 | Kawai |
| 2022/0260894 | A1 * | 8/2022 | Kawai .................. G03B 5/02 |

FOREIGN PATENT DOCUMENTS

| | | | |
|---|---|---|---|
| JP | 2003-202623 | A | 7/2003 |
| JP | 2010-237515 | A | 10/2010 |
| JP | 2011-254298 | A | 12/2011 |
| JP | 2012-058524 | A | 3/2012 |
| JP | 2016-085423 | A | 5/2016 |
| JP | 2016-109765 | A | 6/2016 |
| JP | 2017-219591 | A | 12/2017 |
| JP | 2020-013120 | A | 1/2020 |
| JP | 2020-013121 | A | 1/2020 |
| JP | 7451893 | B2 | 3/2024 |
| WO | 2013/039120 | A1 | 3/2013 |
| WO | 2013/168742 | A1 | 11/2013 |

OTHER PUBLICATIONS

Sep. 5, 2023 Office Action issued in Japanese Patent Application No. 2019-124709.

Mar. 5, 2019 Office Action issued in Japanese Patent Application No. 2018-135122.

Mar. 5, 2019 Office Action issued in Japanese Patent Application No. 2019-025533.

Mar. 5, 2019 English Translation of Office Action issued in Japanese Patent Application No. 2018-135122.

Mar. 5, 2019 English Translation of Office Action issued in Japanese Patent Application No. 2019-025533.

Dec. 20, 2019 Search Report issued in European Patent Application No. 19186535.1.

Jan. 21, 2022 Office Action issued in European Patent Application No. 19 186 535.1.

Apr. 27, 2021 Office Action issued in Chinese Patent Application No. 202011081256.1.

Mar. 5, 2019 Office Action issued in Japanese Patent Application No. 2018-135123.

Jan. 7, 2020 Extended Search Report issued in European Patent Application No. 19186533.6.

May 28, 2021 Office Action issued in U.S. Appl. No. 16/511,554.

May 28, 2021 Office Action issued in U.S. Appl. No. 16/512,747.

Oct. 15, 2021 Office Action issued in U.S. Appl. No. 16/512,747.

Feb. 17, 2022 Notice of Allowance issued in U.S. Appl. No. 16/512,747.

Mar. 25, 2022 Corrected Notice of Allowability issued in U.S. Appl. No. 16/512,747.

Oct. 11, 2022 Office Action issued in Indian Patent Application No. 201914028578.

Dec. 3, 2024 Office Action issued in Japanese Patent Application No. 2024-033359.

* cited by examiner

FIG. 6

|  | FIRST GENERATION | SECOND GENERATION | THIRD GENERATION | FOURTH GENERATION |
|---|---|---|---|---|
| COMMUNICATION SPEED | V1 | V2 | V3 | V4 |
| COMMUNICATION INTERVAL | T1 | T2 | T3 | T4 |
| NUMBER OF SETS OF DATA | N1 | N2 | N3 | N4 |
| SAMPLING INTERVAL | S1 | S2 | S3 | S4 |

FIG. 7

| BODY<br>LENS | FIRST<br>GENERATION | SECOND<br>GENERATION | THIRD<br>GENERATION | FOURTH<br>GENERATION |
|---|---|---|---|---|
| FIRST<br>GENERATION | FIRST<br>GENERATION | FIRST<br>GENERATION | FIRST<br>GENERATION | FIRST<br>GENERATION |
| SECOND<br>GENERATION | FIRST<br>GENERATION | SECOND<br>GENERATION | SECOND<br>GENERATION | SECOND<br>GENERATION |
| THIRD<br>GENERATION | FIRST<br>GENERATION | SECOND<br>GENERATION | THIRD<br>GENERATION | THIRD<br>GENERATION |
| FOURTH<br>GENERATION | FIRST<br>GENERATION | SECOND<br>GENERATION | THIRD<br>GENERATION | FOURTH<br>GENERATION |

FIG. 8

| BODY / LENS | FIRST GENERATION | SECOND GENERATION | THIRD GENERATION | FOURTH GENERATION |
|---|---|---|---|---|
| FIRST GENERATION ONLY | FIRST GENERATION | FIRST GENERATION | FIRST GENERATION | FIRST GENERATION |
| SECOND GENERATION ONLY | NORMAL OPERATION NOT EXECUTED | SECOND GENERATION | SECOND GENERATION | SECOND GENERATION |
| THIRD GENERATION ONLY | NORMAL OPERATION NOT EXECUTED | NORMAL OPERATION NOT EXECUTED | THIRD GENERATION | THIRD GENERATION |
| FOURTH GENERATION ONLY | NORMAL OPERATION NOT EXECUTED | NORMAL OPERATION NOT EXECUTED | NORMAL OPERATION NOT EXECUTED | FOURTH GENERATION |

ACCESSORY

INCORPORATION BY REFERENCE

This is a Divisional of U.S. patent application Ser. No. 16/512,747 filed Jul. 16, 2019 (now U.S. Pat. No. 11,366,373), which claims priority from Japanese Patent Application No. 2018-135122 filed in Japan on Jul. 18, 2018. The disclosure of each of the above-identified prior applications is hereby incorporated by reference herein in their entireties.

TECHNICAL FIELD

The present invention relates to an accessory.

BACKGROUND ART

A camera system in the related art allows an accessory, a typical example of which is an interchangeable lens, to be mounted at a camera body. Optimal data communication needs to be carried out between such an accessory and the camera body.

CITATION LIST

Patent Literature

PTL 1: Japanese Laid Open Patent Publication No. 2016-85423

SUMMARY OF INVENTION

According to a first aspect of the present invention, an accessory that is mountable at a camera body and is capable of communicating with the camera body, comprises: a transmission unit capable of transmitting information pertaining to a drive target member that is driven by a drive unit to the camera body according to at least one communication specification; and a reception unit that receives from the camera body a first value specifying a communication specification according to which the information is transmitted to the camera body, wherein: the transmission unit transmits the information pertaining to the drive target member to the camera body according to the communication specification specified by the first value.

According to a second aspect of the present invention, an accessory that is mountable at a camera body and is capable of communicating with the camera body, comprises: a first transmission unit capable of transmitting information pertaining to a drive target member that is driven by a drive unit to the camera body according to at least one communication specification; a second transmission unit that transmits to the camera body a first value specifying a communication specification according to which the information is transmitted to the camera body; and a reception unit that receives, from the camera body, a second value specifying a communication specification according to which the information is transmitted to the camera body, wherein: the first transmission unit transmits the information to the camera body according to the communication specification specified by the first value or the second value if the first value and the second value are equal to each other.

According to a third aspect of the present invention, an accessory that is mountable at a camera body and is capable of communicating with the camera body, comprises: a first transmission unit capable of transmitting information pertaining to a drive target member that is driven by a drive unit to the camera body according to at least one communication specification; a second transmission unit that transmits to the camera body a first value specifying a communication specification according to which the information is transmitted to the camera body; and a reception unit that receives from the camera body a second value specifying a communication specification according to which the information is transmitted to the camera body, wherein: the first transmission unit transmits the information to the camera body according to the communication specification specified by the second value if the first value and the second value are different from each other.

BRIEF DESCRIPTION OF DRAWINGS

FIG. 6 shows a chart presenting examples of different generations according to the first embodiment.

FIG. 7 shows a chart presenting examples of generations that may be selected in the camera in the first embodiment.

FIG. 8 shows a chart presenting examples of generations that may be determined in the camera in the first embodiment.

DESCRIPTION OF EMBODIMENTS

First Embodiment

Figure 1:
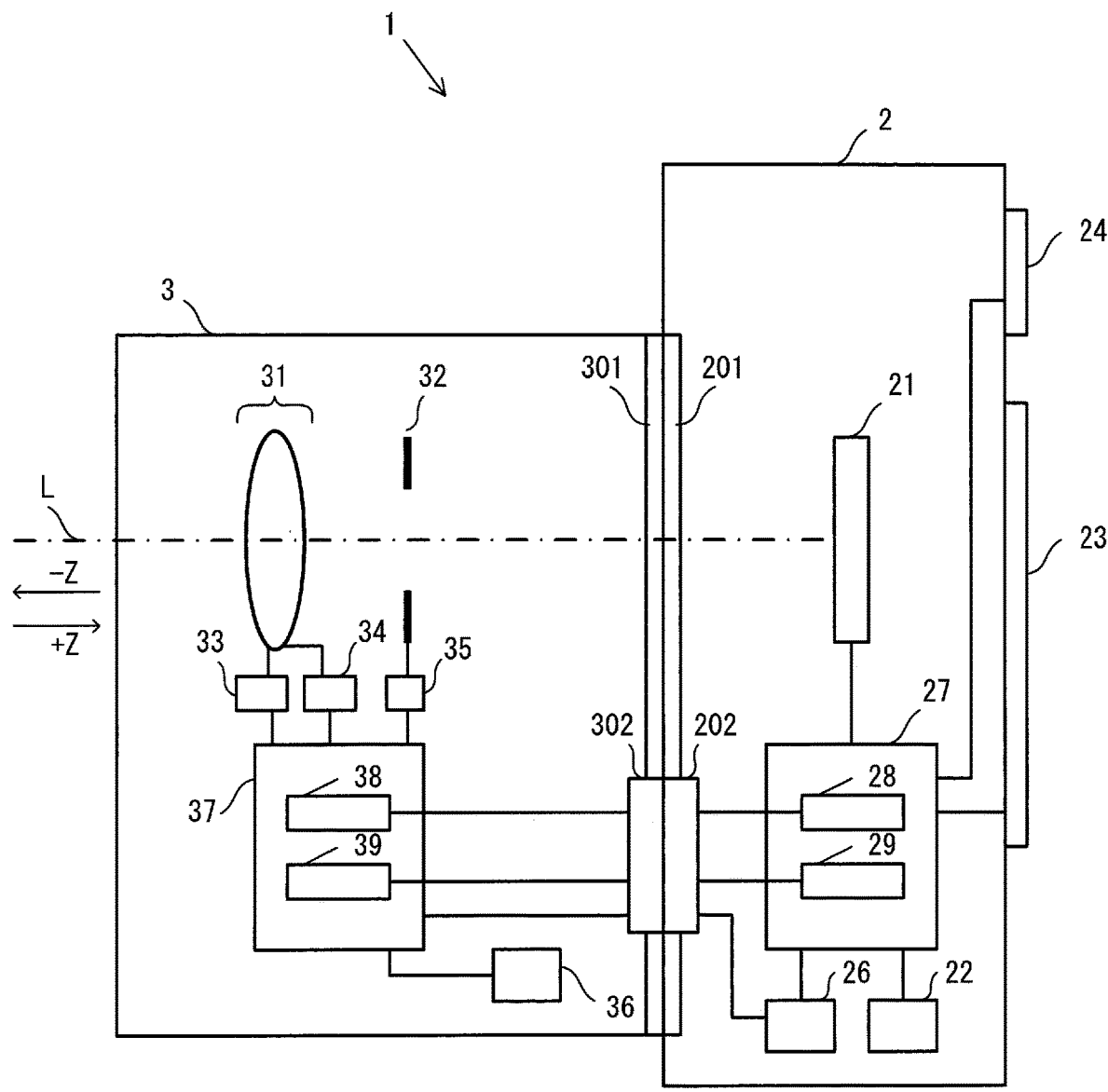
FIG. 1 is a diagram presenting an example of a structure that may be adopted in a camera according to a first embodiment.

FIG. 1 is a diagram showing a structure that may be adopted in a camera 1 achieved as an example of an image capturing device in the first embodiment. The camera 1 is configured with a camera body 2 and an interchangeable lens 3 that is an attachable accessory. The camera 1, configured with the camera body 2 and the interchangeable lens 3 as described above, may be otherwise referred to as a camera system.

A body-side mount unit 201, at which the interchangeable lens 3 is mounted, is disposed at the camera body 2. A lens-side mount unit 301, which is mounted at the camera body 2, is disposed at the interchangeable lens 3. A lens-side connection unit 302 and a body-side connection unit 202 are respectively disposed at the lens-side mount unit 302 and at the body-side mount unit 201. The lens-side connection unit 302 and the body-side connection unit 202 each include a plurality of terminals or contacts such as clock signal terminals, data signal terminals and power supply terminals disposed therein, as will be described later. The interchangeable lens 3 is detachably mounted via the lens-side mount unit 301 at the body-side mount unit 201 of the camera body 2.

As the interchangeable lens 3 is mounted at the camera body 2, the terminals disposed at the body-side connection unit 202 and the terminals disposed at the lens-side connection unit 302 become electrically connected. As a result, it becomes possible to provide electric power from the camera body 2 to the interchangeable lens 3 and to carry out communication between the camera body 2 and the interchangeable lens 3.

The structure of the interchangeable lens 3 will be first described in detail. The interchangeable lens 3 includes a photographic optical system 31, an aperture stop 32, a lens drive unit 33, a lens position detection unit 34, an aperture drive unit 35, a lens memory 36 and a lens control unit 37. While the photographic optical system 31 is represented by a single lens so as to simplify the illustration, it is actually constituted with a plurality of lenses including a focus lens (focus adjustment lens) and as the interchangeable lens is mounted at the camera body 2, a subject image is formed on the image capturing surface of an image sensor 21 via the photographic optical system 31. The photographic optical system 31 may include, for instance, a zoom lens via which the focal length can be varied or an anti-vibration lens (shake-correction lens or blur-correction lens) that reduces the extent of image blurring (attributable to hand movement) as well as the focus lens (focus adjustment lens). It is to be noted that the aperture stop 32 is actually disposed, for instance, among the plurality of lenses in the photographic optical system 31.

The lens drive unit 33 and the aperture drive unit 35 may each be configured with, for instance, a stepping motor, an ultrasonic motor, a DC motor or the like. The lens drive unit 33 controls drive of the photographic optical system 31. The lens drive unit 33 alters the image forming position at which the subject image is formed via the photographic optical system 31 by causing the focus lens to move along an optical axis L based upon, for instance, a signal output from the lens control unit 37. In addition, the aperture drive unit 35 alters the opening diameter of the aperture stop 32 by driving the aperture stop 32 based upon a signal output from the lens control unit 37. It is to be noted that in conjunction with a photographic optical system 31 that includes a zoom lens and an anti-vibration lens, the lens drive unit 33 may include drive sources to drive the zoom lens and the anti-vibration lens via the respective drive sources. In such a case, the lens drive unit 33 will move the zoom lens along the optical axis L based upon a signal output from the lens control unit 37. In addition, the lens drive unit 33 will move the anti-vibration lens along directions intersecting the optical axis L based upon a signal output from the lens control unit 37.

Furthermore, the lens drive unit 33 and the aperture drive unit 35 may each include a drive circuit (e.g., a drive IC) (not shown) that drives the stepping motor, the ultrasonic motor, the DC motor or the like.

The lens position detection unit 34 may be configured with, for instance, a photo-interrupter and an encoder. The photo interrupter detects a passage of a detection target portion (e.g., a focus lens support portion) of the photographic optical system 31 through a reference position (origin point position) on the optical axis L and outputs a detection signal to the lens control unit 37. Based upon the signal output from the photo interrupter, the lens control unit 37 detects a passage of the focus lens through the reference position (origin point position). The encoder, constituted with a linear encoder, generates at least two pulse signals assuming phases different from one another and detects the distance over, and direction along which, the focus lens moves based upon the two or more pulse signals. The distance over which the focus lens has moved, having been detected, is output as a pulse signal to the lens control unit 37. As an alternative, a magnetic encoder or the like may be utilized and a pulse signal corresponding to the absolute position may be output.

It is to be noted that when a stepping motor is used as the lens drive unit 33, a passage through the origin point position may be simply detected via a photo interrupter without utilizing an encoder. In such a case, as the detection target portion (e.g., a focus lens support portion) of the photographic optical system 31 passes through the photo interrupter of the lens position detection unit 34, a signal indicating a passage of the photographic optical system 31 through the origin point position will be output to the lens control unit 37. A pulse signal corresponding to the extent to which the lens is to be moved is output from the lens control unit 37 to a stepping motor drive circuit in the lens drive unit 33 and also a pulse signal, which corresponds to the pulse signal output from the lens control unit 37 to the drive circuit in the lens drive unit 33, corresponding to the extent of the lens movement, is output from the drive circuit in the lens drive unit 33 to the lens control unit 37, so as to drive the photographic optical system 31.

It is to be noted that when the photographic optical system 31 includes a zoom lens or an anti-vibration lens, the lens position detection unit 34 detects the extent of movement with respect to the zoom lens or the anti-vibration lens and generates a signal indicating the extent of zoom lens movement or the focal length of the zoom lens or a signal indicating the extent of anti-vibration lens movement or the position to which the anti-vibration lens moves.

The lens control unit 37, which is constituted with a processor such as a CPU, an FPGA or the like and a memory such as a ROM, a RAM or the like, controls the various components of the interchangeable lens 3 based upon a control program. The lens control unit 37 controls drive of the photographic optical system 31 and the aperture stop 32 via the lens drive unit 33 and the aperture drive unit 35 based upon control signals input thereto from a body control unit 27 in the camera body 2 via the body-side connection unit 202 and the lens-side connection unit 302. For instance, in response to a control signal indicating the direction along which, and the distance over which, the focus lens is to move, the speed at which the focus lens is to move and the like input thereto from the body control unit 27, the lens control unit 37 issues an instruction for controlling drive of the lens drive unit 33 based upon the control signal.

In addition, the lens control unit 37 detects the position of the focus lens, the zoom lens or the like and transmits the detection results to the camera body 2. When a stepping motor is used as the lens drive unit 33, the lens control unit 37 transmits an instruction indicating the extent to which the focus lens is to be driven to the lens drive unit 33. The drive circuit (not shown) in the lens drive unit 33 drives the stepping motor accordingly. As the stepping motor is driven, a pulse signal corresponding to the extent of drive is output from the drive circuit in the lens drive unit 33 to the lens control unit 37.

Based upon an output provided from the photo interrupter in the lens position detection unit 34, the lens control unit 37 senses a passage of the focus lens or the zoom lens through the reference position (origin point position), and further generates information (pulse position information) corresponding to the extent of focus lens movement represented by a cumulative value calculated by counting pulse signals input thereto from the encoder or pulse signals corresponding to the extent of stepping motor drive.

The information corresponding to the extent of focus lens movement (pulse position information) thus generated is transmitted to the camera body 2 through hotline communication, which will be explained later.

The lens memory 36 may be constituted with, for instance, a non-volatile storage medium. Various types of information pertaining to the interchangeable lens 3 are stored in the lens memory 36. For instance, information such as the focal length, the maximum aperture number at the interchangeable lens and information indicating communication specifications or communication conditions that can be supported by the interchangeable lens 3 when it carries out communication with the camera body 2 are stored in the lens memory 36. The information indicating the communication specifications will be referred to as an interchangeable lens generation, as will be explained later. An alternative term "generation information" may be used instead of "the generation". The generation information pertaining to the interchangeable lens 3 will be referred to as lens-side generation information. Data write into the lens memory 36 and data readout from the lens memory 36 are controlled by the lens control unit 37. It is to be noted that the lens-side generation information may instead be stored in an internal memory built into the lens control unit 37.

In addition, the lens control unit 37 includes a first lens communication unit 38 and a second lens communication unit 39. As will be described in detail later, the first lens communication unit 38 is engaged in command data communication with a first body communication unit 28 via the lens-side connection unit 302 and the body-side connection unit 202. The second lens communication unit 39 is engaged in hotline communication with a second body communication unit 29 via the lens-side connection unit 302 and the body-side connection unit 202.

Next, the structure of the camera body 2 will be explained in detail. The image sensor 21, a body memory 22, a display unit 23, an operation unit 24, a power supply unit 26 and the body control unit 27 are disposed at the camera body 2. The body control unit 27, which is configured with a processor such as a CPU, an FPGA or the like, and a memory such as a ROM, a RAM or the like, controls the various components of the camera 1 based upon a control program.

The body control unit 27 generates image data by executing predetermined image processing on signals output from the image sensor 21. Such image processing includes image processing of the known art such as, for instance, gradation conversion processing, color interpolation processing and edge enhancement processing. The body control unit 27 also generates control signals used to control drive of the photographic optical system 31 (focus lens drive, zoom lens drive and/or anti-vibration lens drive) and drive of the aperture stop 32.

Furthermore, the body control unit 27 executes processing required for automatic focus adjustment (AF) for the photographic optical system 31. In more specific terms, the body control unit 27 executes focus detection processing by adopting a phase detection method. The image sensor 21 includes focus detection pixels each having part of a photoelectric conversion unit within the pixel shielded with a light-blocking film, disposed in place of some of image capturing pixels that output image capturing signals. The body control unit 27 calculates a defocus quantity representing an extent of defocus through the phase detection method by using focus detection signals output from the focus detection pixels. The body control unit 27 outputs a signal pertaining to the defocus quantity having been calculated, to the lens control unit 37. The lens control unit 37, in turn, drives the focus lens in correspondence to the defocus quantity. It is to be noted that the image sensor 21 may adopt a structure that includes image capturing/focus detection pixels, each having a plurality of photoelectric conversion units disposed therein and capable of outputting both an image capturing signal and a focus detection signal.

Moreover, the body control unit 27 may execute focus detection processing through a contrast detection method instead of focus detection processing executed through the phase detection method or in addition to focus detection processing executed through the phase detection method. Namely, the body control unit 27 may sequentially calculate subject image contrast evaluation values based upon signals provided from the image sensor 21 while moving the focus lens in the photographic optical system 31 along the optical axis L. The body control unit 27 engaged in this focus detection processing then sets each contrast evaluation value in correspondence to a specific focus lens position by using focus lens position information (pulse position information) transmitted from the interchangeable lens 3. The body control unit 27 then calculates an in-focus position for the focus lens. The body control unit 27 outputs a signal corresponding to the calculated in-focus position to the lens control unit 37. The lens control unit 23, in turn, moves the focus lens to the in-focus position.

The power supply unit 26, which includes a power source, supplies electric power to components within the camera body 2 and to the interchangeable lens 3. The power supply unit 26 is connected to the body-side connection unit 202 and the body control unit 27. The power supply unit 26 provides electric power to the lens control unit 37 via the body-side connection unit 202 and the lens-side connection unit 302.

The image sensor 21 may be, for instance, a CMOS image sensor or a CCD image sensor. The image sensor 21 receives a light flux having passed through the photographic optical system 31 and captures a subject image. The image sensor 21 includes a plurality of pixels each having a photoelectric conversion unit, disposed thereat in a two-dimensional pattern along a row direction and a column direction. The photoelectric conversion unit may be constituted with, for instance, a photodiode (PD). The image sensor 21 generates signals through photoelectric conversion of the light received thereat and outputs the signals thus generated to the body control unit 27.

The body memory 22 may be constituted with, for instance, a non-volatile storage medium. A program based upon which the camera body 2 and the camera 1 are controlled is stored in the body memory 22. In addition, information indicating a camera body generation, to be explained later, i.e., information indicating communication specifications that can be supported by the camera body 2 when carrying out communication with the interchangeable lens 3, is also stored in the body memory 22. The information indicating the communication specifications is otherwise referred to as a camera body generation, as will be explained later. Such a "generation" may be alternatively referred to as generation information. The generation information pertaining to the camera body 2 will be referred to as body-side generation information. Data write into the body memory 22 and data readout from the body memory 22 are controlled by the body control unit 27. It is to be noted that image data may be stored in the body memory 22 or they may be stored into a separate storage medium. In addition, the body-side generation information may be stored into an internal memory built into the body control unit 27, instead.

At the display unit 23, an image is displayed based upon image data, and information pertaining to a photographing operation such as shutter speed, aperture stop setting and the like, a menu screen and the like are also brought up on display at the display unit 23. The operation unit 24, which includes a shutter release button and various setting switches, including a power switch, outputs an operation signal corresponding to a specific operation to the body control unit 27.

In addition, the body control unit 27 includes the first body communication unit 28 and the second body communication unit 29. As will be explained later, the first body communication unit 28 is engaged in command data communication with the first lens communication unit 38 via the body-side connection unit 202 and the lens-side connection unit 302. The second body communication unit 29 is engaged in hotline communication with the second lens communication unit 39 via the body-side connection unit 202 and the lens-side connection unit 302.

Next, command data communication will be explained. The first lens communication unit 38 and the first body communication unit 28 carry out full duplex communication via the individual terminals disposed in the lens-side connection unit 302 and the body-side connection unit 202. As will be explained later in reference to FIG. 2, the first lens communication unit 38 and the first body communication unit 28 exchange four different types of signals such as an RDY signal, a CLK signal, a DATAB signal and a DATAL signal.

The RDY signal indicates whether or not the first lens communication unit 38 is in a communication-enabled state and is switched to high level (H level) or to low level (L level) by the first lens communication unit 38. The RDY signal is a signal transmitted (output) to the first body communication unit 28. The CLK signal is a clock signal originating on the camera body-side, which is transmitted from the first body communication unit 28 to the first lens communication unit 38. The DATAB signal is a data signal transmitted from the first body communication unit 28 to the first lens communication unit 38. The DATAL signal is a data signal transmitted from the first lens communication unit 38 to the first body communication unit 28.

Next, information (commands, data) transmitted/received through command data communication will be explained. Data pertaining to the optical characteristics (maximum F number, aberration and the like) of the photographic optical system 31, data pertaining to the infinity position and the close-up position of the focus lens, the lens-side generation information, information indicating response contents (response data) including, for instance, the execution status of initialization, executed in response to an initialization command issued by the camera body 2 as will be explained later, or the like, is transmitted in the DATAL signal from the interchangeable lens 3 to the camera body 2. Generation information indicating the communication specifications to be applied to hotline communication, which will be explained later, a control command providing an instruction for drive of the focus lens, the anti-vibration lens or the zoom lens in the photographic optical system 31, drive of the aperture stop 32 or lens initialization, data indicating control contents (control data) or the like, for instance, is transmitted in the DATAB signal from the camera body 2 to the interchangeable lens 3.

Figure 2:
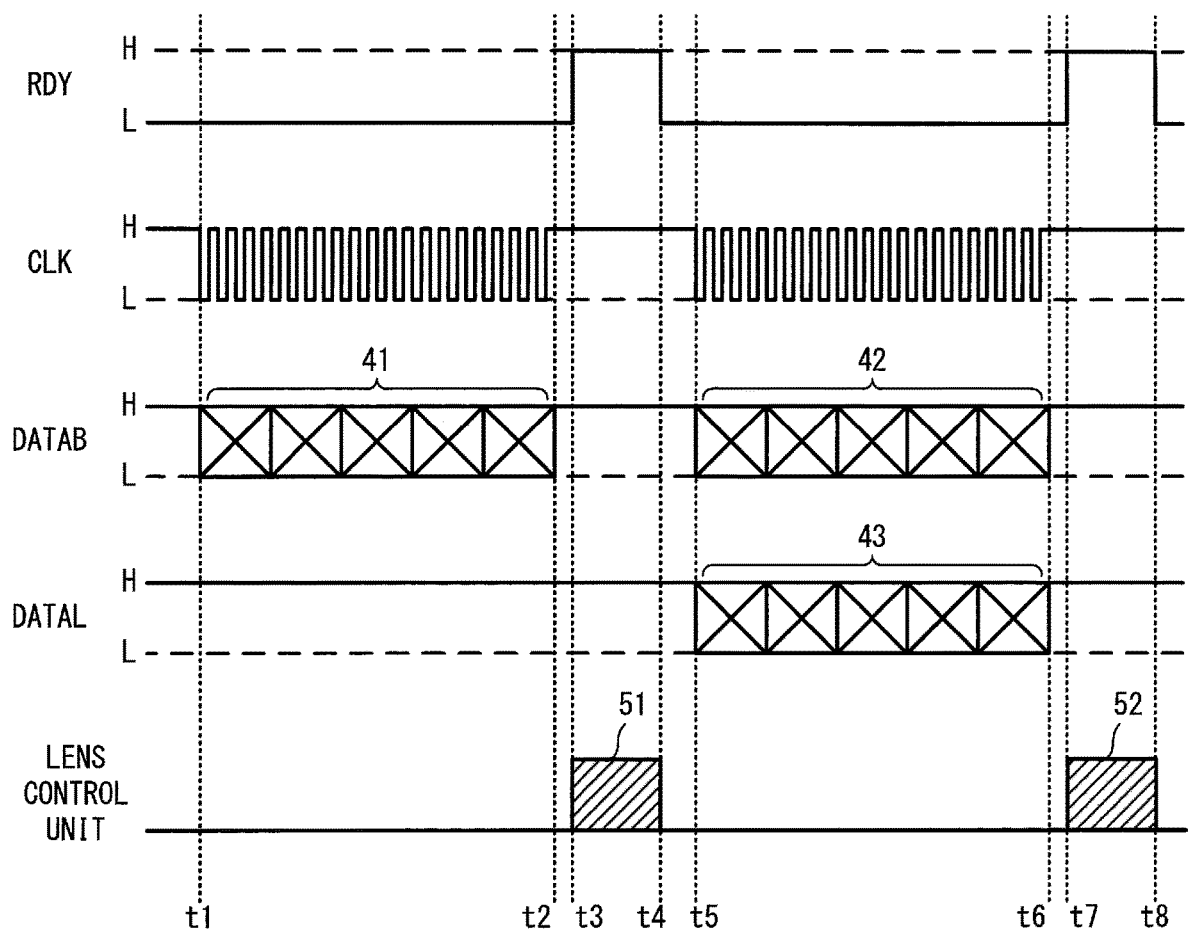
FIG. 2 shows a chart in reference to which command data communication executed in the camera in the first embodiment will be explained.

FIG. 2 is a diagram in reference to which command data communication carried out in the image capturing device in the first embodiment will be explained. The schematic chart presented in FIG. 2 indicates an example of timing with which command data communication may be carried out by the lens control unit 37 and the body control unit 27 via the first lens communication unit 38 and the first body communication unit 28. The first lens communication unit 38 transmits/receives the RDY signal, the CLK signal, the DATAB signal and the DATAL signal to/from the first body communication unit 28.

The signal level assumed for the RDY signal indicates whether or not the first lens communication unit 38 is in a communication-enabled state. When the first lens communication unit 38 is in a state in which it is able to communicate with the first body communication unit 28, the lens control unit 37 sets the RDY signal to low level (L level, e.g., the ground voltage or a reference voltage). If the first lens communication unit 38 is in a state in which it is not able to communicate with the first body communication unit 28, the lens control unit 37 sets the RDY signal to high level (H level, e.g., the source voltage). The first body communication unit 28 detects the signal level of the RDY signal and the body control unit 27 makes a decision as to whether or not the first lens communication unit 38 is in a communication-enabled state.

At a time point t1 at which the RDY signal is at low level (L level), the first body communication unit 28 outputs (transmits) a clock signal (CLK signal) to the first lens communication unit 38. In other words, the first body communication unit 28 alternately switches the signal level of the CLK signal, which has been sustained at a predetermined voltage (e.g., high level, the source voltage) up to the time point t1, between high level and low level (e.g., the ground voltage or a reference voltage) over a predetermined cycle at the time point t1 and beyond. In addition, during a period of time elapsing between the time point t1 and a time point t2, the first body communication unit 28 transmits a command packet 41 in a DATAB signal in synchronization with a rise or a fall of the CLK signal.

It is to be noted that when the RDY signal is at high level (H level), the first lens communication unit 38 is not receptive to communication, and in this state, the first body communication unit 28 does not transmit a command or data to the first lens communication unit 38. In this situation, the first body communication unit 28 sustains the signal levels of the CLK signal and the DATAB signal at a predetermined fixed voltage (e.g., high level).

The lens control unit 37 verifies the contents of the command packet 41 input thereto from the first body communication unit 28 through, for instance, checksum processing or the like and makes a decision as to whether or not the command packet 41 has been received normally. If reception of the command packet 41 at the first lens communication unit 38 is normal, the lens control unit 37 sets the RDY signal to high level at a time point t3. The lens control unit 37 also executes first processing 51 in correspondence to the contents of the command packet 41. Once the first processing 51 is completed, the lens control unit 37 sets the RDY signal to low level at a time point t4. It is to be noted that if reception of the command packet 41 at the first lens communication unit 38 was not normal, the lens control unit 37 notifies the first body communication unit 38 that normal reception of the command packet 41 has not occurred by sustaining the RDY signal at low level.

Upon detecting that the RDY signal has shifted from high level to low level, the first body communication unit 28 resumes the output of the CLK signal at a time point t5. In addition, during a period of time elapsing between the time point t5 and a time point t6, the first body communication unit 28 transmits a data packet 42 in a DATAB signal in synchronization with a rise or a fall of the CLK signal. During the same time period elapsing between the time point t5 and the time point t6, the first lens communication unit 38 transmits a data packet 43 in a DATAL signal in synchronization with a rise or a fall of the CLK signal input thereto from the first body communication unit 28.

As the data packet 42 from the first body communication unit 28 is received in a normal manner at the first lens communication unit 38, the lens control unit 37 sets the RDY signal to high level at a time point t7. The lens control unit 37 executes second processing 52 in correspondence to the contents of the data packet 42. Once the second processing 52 is completed, the lens control unit 37 sets the RDY signal to low level at a time point t8.

The contents of the command packet 41 and the data packet 42 output from the first body communication unit 28 as described above may be, for instance, a request for initialization of the interchangeable lens 3, a request for specific data, a drive instruction for a drive target member (e.g., the focus lens, the aperture stop or the like) in the photographic optical system 31, a start instruction for the second lens communication unit 39 to start hotline communication and the like. The lens control unit 37 executes processing for generating the specific data having been requested, processing for driving the drive target member, or the like, as the first processing 51 or the second processing 52. The lens control unit 37 transmits, for instance, flag data indicating that initialization of the interchangeable lens 3 has been completed, data indicating the optical characteristics of the interchangeable lens 3, data indicating that the drive of the drive target member has been completed as instructed, or the like in the data packet 43.

Next, hotline communication will be explained in detail. The second lens communication unit 39 and the second body communication unit 29 shown in FIG. 1 are engaged in unidirectional communication from the interchangeable lens 3 to the camera body 2 via individual terminals in the lens-side connection unit 302 and the body-side connection unit 202. The second lens communication unit 39 transmits two types of signals, such as an HCLK signal and an HDATA signal to the second body communication unit 29.

The HCLK signal is a clock signal originating on the interchangeable lens-side, transmitted from the second lens communication unit 39 to the second body communication unit 29. The HDATA signal, which is a data signal transmitted from the second lens communication unit 39 to the second body communication unit 29, carries information pertaining to the lens position of the focus lens, the zoom lens or the anti-vibration lens explained earlier or information pertaining to the opening diameter of the aperture stop 32. The second lens communication unit 39 transmits the HDATA signal to the second body communication unit 29 in synchronization with a cyclical rise or fall of the HCLK signal. In other words, the second lens communication unit 39 and the second body communication unit 29 are engaged in unidirectional communication through which a clock signal and a data signal are transmitted from the second lens communication unit 39 to the second body communication unit 29.

It is to be noted that the cycle of the CLK signal used in command data communication either substantially matches or is shorter than the cycle of the HCLK signal used in hotline communication. The frequency of the CLK signal output from the camera body 2 to the interchangeable lens 3 may be, for instance, 8 MHz, whereas the frequency of the HCLK signal output from the interchangeable lens 3 to the camera body 2 may be, for instance, 2.5 MHz to 8 MHz.

Figure 3:
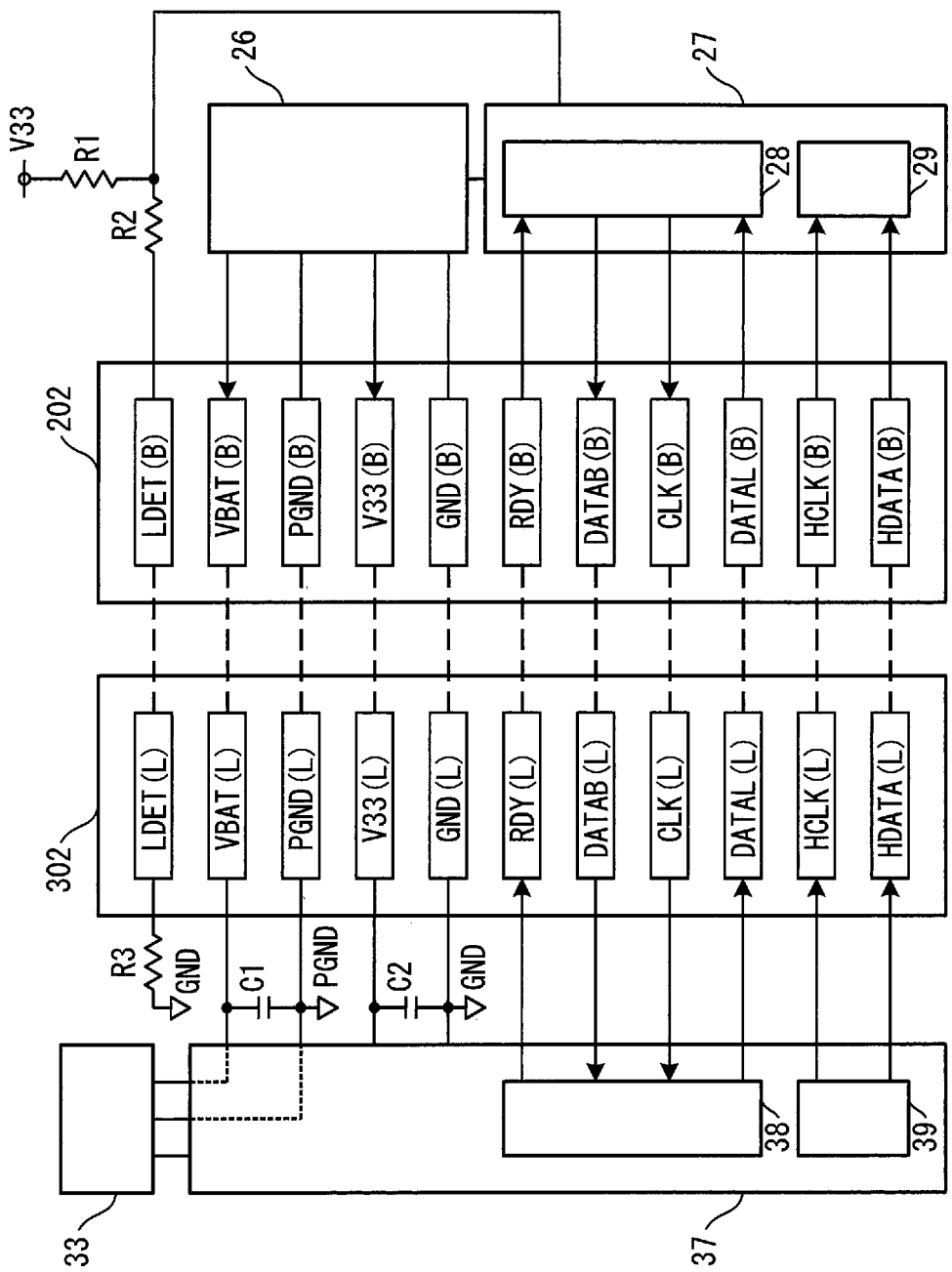
FIG. 3 is a schematic diagram illustrating electric connections achieved at a lens-side connection unit and a body-side connection unit in the first embodiment.

Next, the electrical connections at the lens-side connection unit 302 and the body-side connection unit 202 will be explained. FIG. 3 is a diagram schematically illustrating the electric connections achieved at the lens-side connection unit 302 and the body-side connection unit 202. The body-side connection unit 202 includes an LDET (B) terminal, a VBAT (B) terminal, a PGND (B) terminal, a V33 (B) terminal, a GND (B) terminal, a RDY (B) terminal, a DATAB (B) terminal, a CLK (B) terminal, a DATAL (B) terminal, an HCLK (B) terminal and an HDATA (B) terminal. The 11 body-side terminals will be collectively referred to as a body-side terminal group.

The LDET (B) terminal is a terminal used to sense whether or not the interchangeable lens 3 is mounted. The LDET (B) terminal is connected to the body control unit 27 via a resistor R2. A source V33 supplied from the power supply unit 26 is connected, via a resistor R1, between the resistor R2 and the body control unit 27, thereby pulling up the LDET (B) terminal.

The VBAT (B) terminal, the PGND (B) terminal, the V33 (B) terminal and the GND (B) terminal are camera body-side source system terminals, which are connected to the power supply unit 26. In FIG. 3, the direction along which electric power is supplied is indicated by arrows. The VBAT (B) terminal is a terminal used to provide electric power (provide the source voltage) to the drive system of the interchangeable lens 3. The lens drive unit 33 in the interchangeable lens 3 is driven with electric power provided via the VBAT (B) terminal. The voltage applied by the power supply unit 26 to the VBAT (B) terminal is, at most, approximately 10 V. The PGND (B) terminal is a ground terminal corresponding to the VBAT (B) terminal, which assumes a ground potential (ground) for the drive system source voltage supplied via the VBAT (B) terminal.

The V33 (B) terminal is a terminal used to provide electric power (provide the source voltage) to the circuit system in the interchangeable lens 3. The lens control unit 37 and the like are engaged in operation with the electric power provided from the power supply unit 26 via the V33 (B) terminal. Components such as the lens control unit 37 can be engaged in operation at a lower voltage and a smaller current than the lens drive unit 33. The voltage applied by the power supply unit 26 to the V33 (B) terminal is, at most, approximately 3.3 V. The GND (B) terminal is a ground terminal corresponding to the V33 (B) terminal and assumes a ground potential (ground) for the source voltage supplied to the circuit system via the V33 (B) terminal.

The RDY (B) terminal, the DATAB (B) terminal, the CLK (B) terminal, the DATAL (B) terminal, the HCLK (B) terminal and the HDATA (B) terminal are communication system terminals connected to the body control unit 27 and are used to transmit/receive the RDY signal, the DATAB signal, the CLK signal, the DATAL signal, the HCLK signal and the HDATA signal to/from the corresponding RDY (L) terminal, DATAB (L) terminal, CLK (L) terminal, DATAL (L) terminal, HCLK (L) terminal and HDATA (L) terminal to be explained later. The RDY (B) terminal, the DATAB (B) terminal, the CLK (B) terminal and the DATAL (B) terminal are connected to the first body communication unit 28 in the body control unit 27 and are used in command data communication as has been explained earlier. In addition, the HCLK (B) terminal and the HDATA (B) terminal are connected to the second body communication unit 29 and are used in hotline communication as has been explained earlier. In FIG. 3, flows of signals are indicated with arrows. The potential at the RDY (B) terminal indicates whether or not the interchangeable lens 3 is able to carry out command data communication. The DATAB (B) terminal is a terminal through which a signal is output to the interchangeable lens 3. The CLK (B) terminal is a terminal through which a clock signal originating on the camera body-side is output to the interchangeable lens 3.

The DATAL (B) terminal is a terminal through which a data signal from the interchangeable lens 3 is input.

The HCLK (B) terminal is a terminal through which a clock signal originating on the interchangeable lens-side is input from the interchangeable lens 3. The HDATA (B) terminal is a terminal through which a data signal from the interchangeable lens 3 is input.

The lens-side connection unit 302 includes the LDET (L) terminal, the VBAT (L) terminal, the PGND (L) terminal, the V33 (L) terminal, the GND (L) terminal, the RDY(L) terminal, the DATAB (L) terminal, the CLK(L) terminal, the DATAL (L) terminal, the HCLK (L) terminal and the HDATA (L) terminal. These 11 lens-side terminals will be collectively referred to as a lens-side terminal group.

As the interchangeable lens 3 is mounted at the camera body 2, the body-side terminals and the lens-side terminals become electrically connected with each other, as indicated with the dotted lines in FIG. 3. More specifically, the LDET (L) terminal is connected to the LDET (B) terminal, the VBAT (L) terminal is connected to the VBAT (B) terminal, the PGND (L) terminal is connected to the PGND (B) terminal, the V33 (L) terminal is connected to the V33 (B) terminal, the GND (L) terminal is connected to the GND (B) terminal, the RDY (L) terminal is connected to the RDY(B) terminal, the DATAB (L) terminal is connected to the DATAB (B) terminal, the CLK (L) terminal is connected to the CLK(B) terminal, the DATAL (L) terminal is connected to the DATAL (B) terminal, the HCLK (L) terminal is connected to the HCLK (B) terminal and the HDATA (L) terminal is connected to the HDATA (B) terminal. The roles of the individual lens-side terminals correspond to the roles of the body-side terminals to which they are connected.

The LDET (L) terminal is grounded via a resistor R3. As the LDET (L) terminal comes into contact with the LDET (B) terminal, the potential at the LDET (B) terminal is pulled down. The VBAT (L) terminal and the PGND (L) terminal are connected to the lens drive unit 33 and the aperture drive unit 35 via the lens control unit 37. A capacitor C1, which is generally referred to as a bypass capacitor, is connected between the VBAT (L) terminal and the PGND (L) terminal. The V33 (L) terminal and the GND (L) terminal are connected to the lens control unit 37. A bypass capacitor C2 is connected between the V33 (L) terminal and the GND (L) terminal. The RDY (L) terminal, the DATAB (L) terminal, the CLK (L) terminal, the DATAL (L) terminal, the HCLK (L) terminal and the HDATA (L) terminal are each connected to the lens control unit 37. The RDY (L) terminal, the DATAB (L) terminal, the CLK (L) terminal and the DATAL (L) terminal are connected to the first lens communication unit 38 in the lens control unit 37 and are used in command data communication as has been explained earlier. In addition, the HCLK (L) terminal and the HDATA (L) terminal are connected to the second lens communication unit 39 and are used in hotline communication as has been explained earlier.

Communication, through which control contents (control data) from the body control unit 27 and response contents (response data) from the lens control unit 37 are concurrently transmitted/received after a control command from the body control unit 27 is transmitted to the lens control unit 37 at the interchangeable lens 3, is referred to as command data communication. The command data communication is full duplex communication. The command data communication is carried out through digital data communication executed by using the RDY(B) terminal, the RDY (L) terminal, the DATAB (B) terminal, the DATAB (L) terminal, the CLK (B) terminal, the CLK (L) terminal, the DATAL (B) terminal and the DATAL (L) terminal via the first body communication unit 28 and the first lens communication unit 38.

The body control unit 27 transmits various control commands and control contents to the interchangeable lens 3 and receives response contents from the interchangeable lens 3 so as to transmit/receive various types of information to/from the interchangeable lens 3 through command data communication carried out via the first body communication unit 28 and the first lens communication unit 38. A control command transmitted through this communication may be, for instance, a lens information transmission command. The various types of information received from the interchangeable lens 3 may be, for instance, model information pertaining to the interchangeable lens 3, information indicating the optical characteristics such as the focal length of the image capturing optical system 31 and the like. Various types of information transmitted to the interchangeable lens 3 may be, for instance, control contents such as a lens drive quantity, model information pertaining to the camera body 2 and the like. It is to be noted that control commands also include a drive command for the focus lens (not shown). Through command data communication, the lens control unit 37 receives various control commands and various types of information from the body control unit 27 and transmits various types of information to the body control unit 27.

Figure 4A:
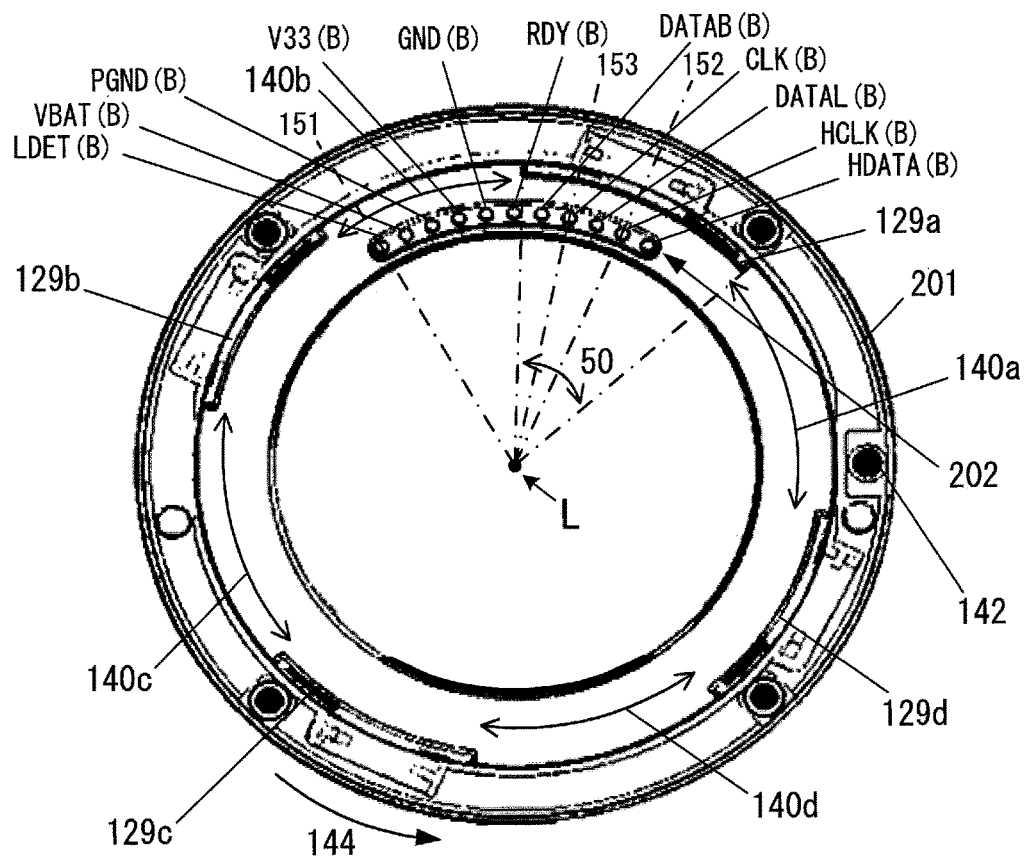
FIGS. 4A and 4B show schematic illustrations of a camera body mount in the first embodiment, viewed from the side where an interchangeable lens is located.

FIG. 4A is a schematic illustration of the mount at the camera body 2, viewed from the side where the interchangeable lens 3 is located. The body-side mount unit 201 includes an annular reference surface having a constant width. The body-side mount unit 201 further includes a body-side first claw or tab portion 129*a*, a body-side second claw portion 129*b*, a body-side third claw portion 129*c* and a body-side fourth claw portion 129*d*. In the following description, these four claw portions may be generically referred to as body-side claw portions 129.

The body-side claw portions 129 are disposed at positions set apart from one another along the circular opening of the body-side mount unit 201. As FIG. 4A illustrates, the body-side first claw portion 129*a* is disposed at an upper right position, the body-side second claw portion 129*b* is disposed at an upper left position, the body-side third claw portion 129*c* is disposed at a lower left position and the body-side fourth claw portion 129*d* is disposed at a lower right position.

The body-side first claw portion 129*a* through the body-side fourth claw portion 129*d* have lengths, measured along the circumferential direction, that are different from one another. In more specific terms, the body-side first claw portion 129*a* has the greatest length, the body-side third claw portion 129*c* has the second greatest length, the body-side fourth claw portion 129*d* has the third greatest length and the body-side second claw portion 129*b* has the smallest length.

The body-side claw portions 129 project out from the body-side mount unit 201 toward the center of the opening, and the circumferential area along the opening includes areas where the body-side claw portions 129 are present and areas where no body-side claw portion 129 is present. In the following description, a space 140a located between the body-side first claw portion 129a and the body-side fourth claw portion 129d on the circumference of the opening of the body-side mount unit 201 will be referred to as a body-side first through portion 140a. Likewise, a space 140b located between the body-side first claw portion 129a and the body-side second claw portion 129b will be referred to as a body-side second through portion 140b, a space 140c located between the body-side second claw portion 129b and the body-side third claw portion 129c will be referred to as a body-side third through portion 140c and a space 140d located between the body-side third claw portion 129c and the body-side fourth claw portion 129d will be referred to as a body-side fourth through portion 140d. These four body-side through portions will be generically referred to as body-side through portions 140.

The body-side connection unit 202 is disposed on the inner side along the opening of the body-side mount unit 201. The body-side connection unit 202 assumes a circular arc shape corresponding to the shape of the annular body-side mount unit 201. It is preferable that the body-side connection unit 202 be disposed at an upper part in the opening of the body-side mount unit 201 so as to range along the opening of the body-side mount unit 201 at the top center position as shown in FIG. 4A. The body-side connection unit 202 includes a plurality of body-side terminals as has been explained earlier. The plurality of body-side terminals are disposed in the body-side connection unit 202 in a single line so as to form a circular arc on the inner side of the body-side mount unit 201. The plurality of body-side terminals are 11 terminals, i.e., HDATA (B), HCLK (B), DATAL (B), CLK (B), DATAB (B), RDY (B), GND (B), V33 (B), PGND (B) VBAT (B) and LDET (B), disposed in this order starting from the right side and the LDET (B) terminal located at the furthest left position, as shown in FIG. 4A. The terminals in the body-side terminal group are each constituted with an electrically conductive pin. The body-side terminal group is pressed along the −Z direction (see FIG. 1) by a spring or the like (not shown). The −Z direction is a direction running toward the interchangeable lens 3 to be mounted at the camera body 2, i.e., running toward the subject.

The body-side mount unit 201 includes a hole through which a lock pin 142 is inserted. The hole through which the lock pin 142 is inserted is formed at an upper right position relative to the body-side fourth claw portion 129d. In other words, the hole for the lock pin 142 is disposed on the annular reference surface of the body-side mount unit 201, at a position between the area along the opening of the body-side mount 201 the inner side of which the body-side fourth claw portion 129d is present and the area along the opening the inner side of which the body-side first claw portion 129a is present. The lock pin 142 is pressed along the −Z direction (see FIG. 1) by a spring or the like (not shown).

Figure 4B:
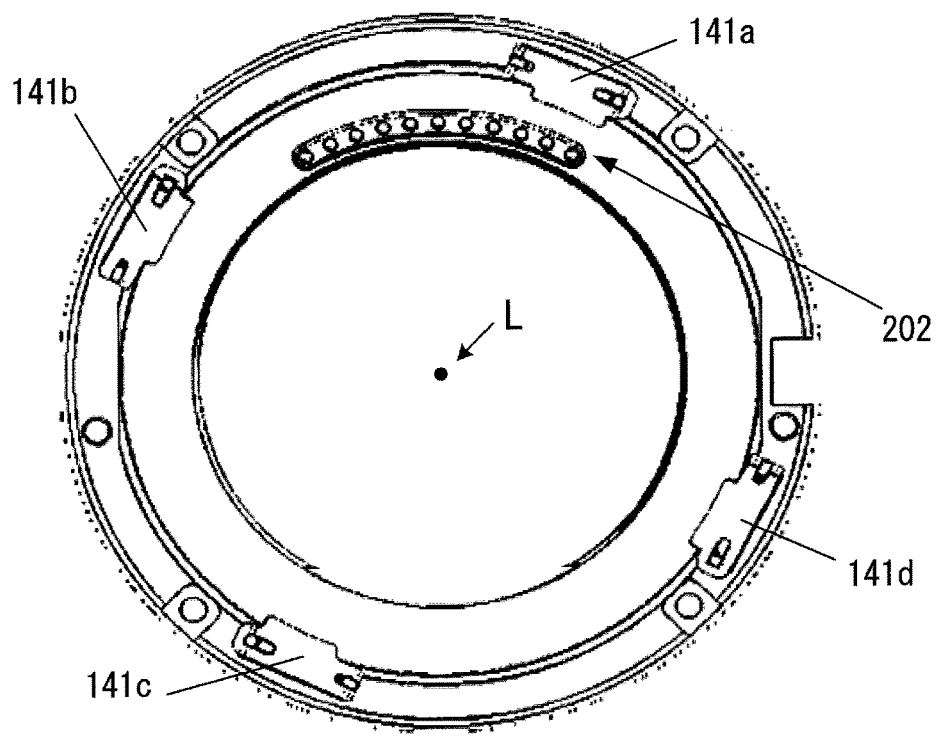

FIG. 4B is a schematic illustration of the mount at the camera body 2 without the body-side mount unit 201, viewed from the side where the interchangeable lens 3 is located. A first plate spring 141a is disposed at a position (on the back side of the body-side first claw portion 129a which is the +Z direction) corresponding to the body-side first claw portion 129a. Likewise, a second plate spring 141b is disposed at a position (on the back side of the body-side second claw portion 129b) corresponding to the body-side second claw portion 129b, a third plate spring 141c is disposed at a position (on the back side of the body-side third claw portion 129c) corresponding to the body-side third claw portion 129c and a fourth plate spring 141d is disposed at a position (on the back side of the body-side fourth claw portion 129d) corresponding to the body-side fourth claw portion 129d. In the following description, these four plate springs will be generically referred to as plate springs 141. Lens-side claw portions, to be described later, are pressed along the +Z direction (toward the camera body 2) via the plate springs 141.

Figure 5:
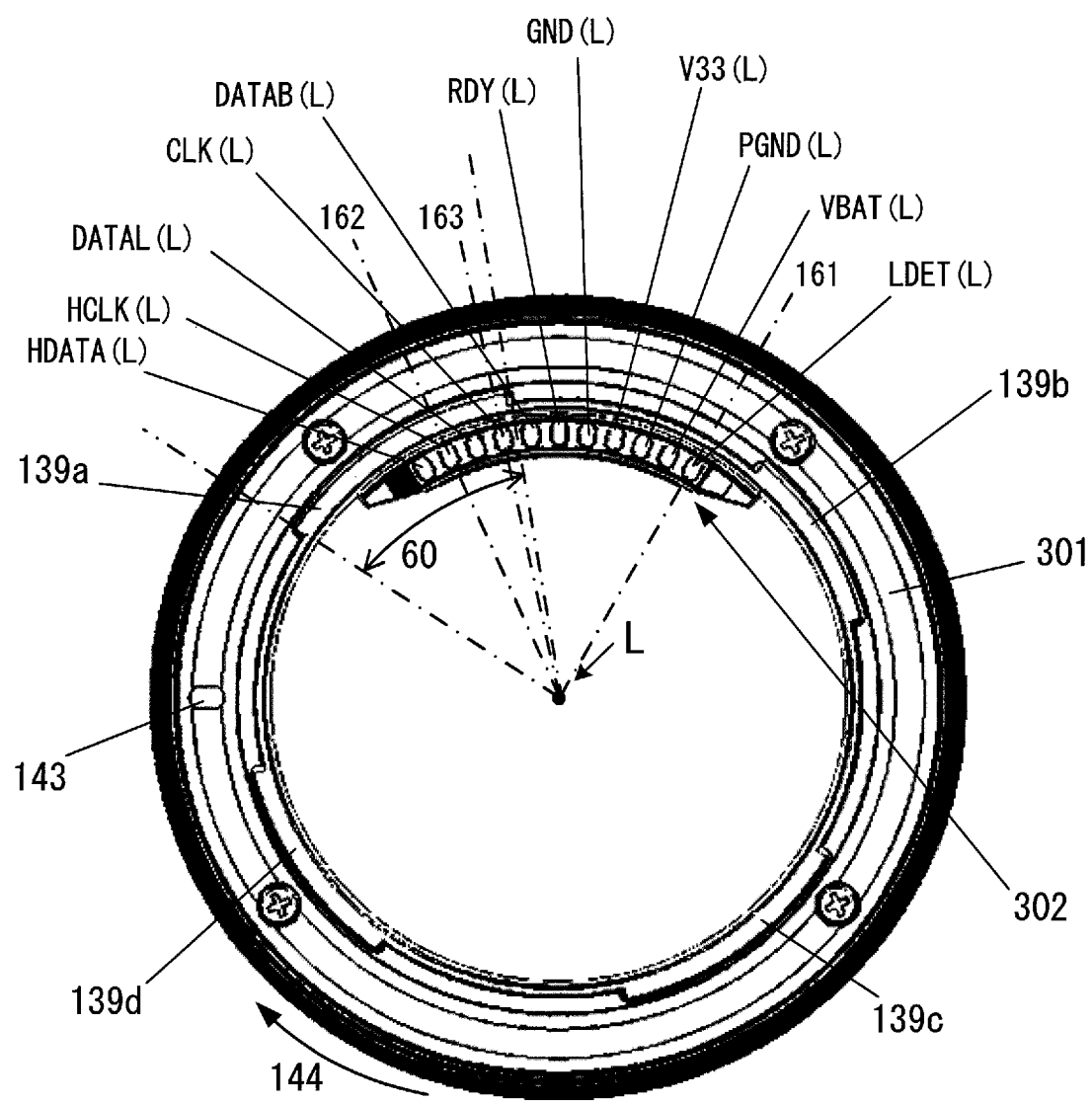
FIG. 5 is a schematic illustration of an interchangeable lens mount in the first embodiment, viewed from the side where the camera body is located.

FIG. 5 is a schematic illustration of the mount at the interchangeable lens 3, viewed from the side where the camera body 2 is located. The interchangeable lens 3 includes the lens-side mount unit 301 and the lens-side connection unit 302 having been described in reference to FIG. 1. The lens-side mount unit 301 includes an annular reference surface assuming a constant width. As the interchangeable lens 3 is mounted at the camera body 2, the annular reference surface of the lens-side mount unit 301 comes into contact with the annular reference surface of the body-side mount unit 201 mentioned earlier. The lens-side mount unit 301 further includes a cylindrical portion disposed at the inner circumference thereof, which ranges along the optical axis. The lens-side mount unit 301 includes a lens-side first claw portion 139a, a lens-side second claw portion 139b, a lens-side third claw portion 139c and a lens-side fourth claw portion 139d, disposed at positions set apart from one another along the outer circumference of the cylindrical portion. In the following description, these four claw portions will be generically referred to as lens-side claw portions 139.

The lens-side claw portions 139 are disposed so as to project outward from the outer circumference of the cylindrical portion of the lens-side mount unit 301 (along a radial direction originating at the optical axis L). As shown in FIG. 5, the lens-side first claw portion 139a is disposed at an upper left position, the lens-side second claw portion 139b is disposed at an upper right position, the lens-side third claw portion 139c is disposed at a lower right position and the lens-side fourth claw portion 139d is disposed at a lower left position. On the side to the rear relative to the lens-side claw portions 139 (toward the reference surface of the lens-side mount unit 301), spaces into which the corresponding body-side claw portions 129 are inserted as the interchangeable lens 3 is mounted at the camera body 2 are present.

The lens-side connection unit 302 is disposed at the inner side of the opening of the lens-side mount unit 301. The lens-side connection unit 302 assumes a circular arc shape corresponding to the shape of the annular lens-side mount unit 301. It is preferable that the lens-side connection unit 302 be disposed at an upper part in the opening of the lens-side mount unit 301 along the opening of the lens-side mount unit 301 so as to be disposed at the top center position, as shown in FIG. 5. The lens-side connection unit 302 includes a plurality of lens-side terminals as has been explained earlier. The plurality of lens-side terminals are disposed in the lens-side connection unit 302 in a single row so as to form a circular arc on the inner side of the lens-side mount unit 301. The plurality of lens-side terminals, i.e., the 11 terminals; LDET (L), VBAT (L), PGND (L), V33 (L), GND (L), RDY (L), DATAB (L), CLK(L), DATAL (L), HCLK (L) and HDATA (L), are disposed in this order starting from the right side, as shown in FIG. 5. The terminals in the lens-side terminal group are each disposed so that its electrically conductive contact surface is exposed toward the +Z direction (see FIG. 1). The +Z direction is a direction along which the subject light having passed through the photographic optical system 31 advances toward the image sensor 21.

The lens-side mount unit 301 includes a lock pin receptacle portion 143. The lock pin receptacle portion 143 is disposed at an upper left position relative to the lens-side fourth claw portion 139d, as shown in FIG. 5. In other words, the lock pin receptacle portion 143 is disposed at a position located between an area of the lens-side mount unit 301 corresponding to the lens-side first claw portion 139a and an area of the lens-side mount unit 301 corresponding to the lens-side fourth claw portion 139d. The lock pin receptacle portion 143 is a groove in which the lock pin 142 is housed when the interchangeable lens 3 is mounted at the camera body 2. This groove ranges from the reference surface of the lens-side mount unit 301 along the −Z direction (see FIG. 1).

As the interchangeable lens 3 is mounted at the camera body 2, the plurality of body-side terminals come into physical contact with the plurality of corresponding lens-side terminals. Through this contact, the plurality of body-side terminals and the plurality of lens-side terminals become electrically connected. Namely, the plurality of body-side terminals and the plurality of lens-side terminals become electrically continuous.

Mounting the Interchangeable Lens

The method adopted when mounting the interchangeable lens 3 at the camera body 2 will be explained next. The interchangeable lens 3 is mounted at the camera body 2 by first placing the body-side mount unit 201 and the lens-side mount unit 301 so that they face opposite each other, positioning the lens-side first claw portion 139a at the body-side first through portion 140a, the lens-side second claw portion 139b at the body-side second through portion 140b, the lens-side third claw portion 139c at the body-side third through portion 140c and the lens-side fourth claw portion 139d at the body-side fourth through portion 140d. The lens-side first claw portion 139a is inserted into the body-side first through portion 140a, the lens-side second claw portion 139b is inserted into the body-side second through portion 140b, the lens-side third claw portion 139c is inserted into the body-side third through portion 140c and the lens-side fourth claw portion 139d is inserted into the body-side fourth through portion 140d. At this time, the LDET (L) terminal, the VBAT (L) terminal, the PGND (L) terminal and the V33 (L) terminal respectively come into contact with the CLK (B) terminal, the DATAL (B) terminal, the HCLK (B) terminal and the HDATA (B) terminal.

In the state described above, the interchangeable lens 3 is rotated along a mounting direction 144, as indicated in FIG. 4A and FIG. 5. In other words, the body-side first claw portion 129a moves into the space located on the back side of the lens-side first claw portion 139a, the body-side second claw portion 129b moves into the space located on the back side of the lens-side second claw portion 139b, the body-side third claw portion 129c moves into the space located on the back side of the lens-side third claw portion 139c and the body-side fourth claw portion 129d moves into the space located on the back side of the lens-side fourth claw portion 139d. At this time, the plurality of lens-side terminals each sequentially come into contact with a plurality of body-side terminals. It is to be noted that the camera body 2, instead of the interchangeable lens 3, may be rotated along a direction opposite from the mounting direction 144 indicated in FIG. 4A and FIG. 5.

As the lens-side claw portions 139 are inserted in the corresponding body-side through portions 140 and the interchangeable lens 3 is rotated along the mounting direction 144, the LDET (L) terminal, for instance, comes into contact, in sequence, with the CLK(B) terminal, the DATAB (B) terminal, the RDY (B) terminal, the GND (B) terminal, the V33 (B) terminal, the PGND (B) terminal, the VBAT (B) terminal and the LDET (B) terminal. The VBAT (L) terminal comes into contact, in sequence, with the DATAL (B) terminal, the CLK (B) terminal, the DATAB (B) terminal, the RDY (B) terminal, the GND (B) terminal, the V33 (B) terminal, the PGND (B) terminal and the VBAT (B) terminal. The PGND (L) terminal comes into contact, in sequence, with the HCLK (B) terminal, the DATAL (B) terminal, the CLK (B) terminal, the DATAB (B) terminal, the RDY(B) terminal, the GND (B) terminal, the V33 (B) terminal and the PGND (B) terminal. The V33 (L) terminal comes into contact, in sequence, with the HDATA (B) terminal, the HCLK (B) terminal, the DATAL (B) terminal, the CLK (B) terminal, the DATAB (B) terminal, the RDY (B) terminal, the GND (B) terminal and the V33 (B) terminal. The GND (L) terminal comes into contact, in sequence, with the HDATA (B) terminal, the HCLK (B) terminal, the DATAL (B) terminal, the CLK (B) terminal, the DATAB (B) terminal, the RDY (B) terminal and the GND(B) terminal.

The RDY (L) terminal comes into contact, in sequence, with the HDATA (B) terminal, the HCLK (B) terminal, the DATAL (B) terminal, the CLK (B) terminal, the DATAB (B) terminal and the RDY (B) terminal. The DATAB (L) terminal comes into contact, in sequence, with the HDATA (B) terminal, the HCLK (B) terminal, the DATAL (B) terminal, the CLK (B) terminal and the DATAB (B) terminal. The CLK (L) terminal comes into contact, in sequence, with the HDATA (B) terminal, the HCLK (B) terminal, the DATAL (B) terminal and the CLK (B) terminal. The DATAL (L) terminal comes into contact, in sequence, with the HDATA (B) terminal, the HCLK (B) terminal and the DATAL (B) terminal. The HCLK (L) terminal comes into contact, in sequence, with the HDATA (B) terminal and the HCLK (B) terminal.

As the interchangeable lens 3 is rotated by a predetermined angle relative to the camera body 2, it reaches a mount-complete position. At the mount-complete position, each body-side claw portion 129 faces opposite the corresponding lens-side claw portion 139 in the direction of the optical axis and the lock pin 142, pressed along the −Z direction in FIG. 1, moves into the lock pin receptacle portion 143. Once the lock pin 142 moves into the lock pin receptacle portion 143, the interchangeable lens 3 can no longer be rotated and thus cannot be disengaged from the camera body 2. Namely, once the body-side claw portions 129 and the lens-side claw portions 139 reach the predefined mount-complete positions, the positions of the body-side mount unit 201 and the lens-side mount unit 301 relative to each other become fixed. The lens-side claw portions 139 are pressed toward the body-side (+Z direction in FIG. 1) by the plate springs 141. As a result, the plurality of lens-side terminals each come into contact with the corresponding body-side terminal among the plurality of body-side terminals and become electrically connected.

In the following description, the state in which the body-side claw portions 129 and the lens-side claw portions 139 have reached the predetermined mount-complete positions will be referred to as a mount complete state. A state in which the lens-side claw portions 139, having been inserted in the body-side through portions 140, are in the process of moving toward the mount-complete position or a state in which they are moving from the mount-complete position toward the insertion position will be referred to as a mount-incomplete state.

In a mount-incomplete state, the signal level at the LDET (B) terminal is pulled up to high level. When the signal level at the LDET (B) terminal is detected to be high level, the body control unit 27 determines that the interchangeable lens 3 is not mounted. When the interchangeable lens 3 is not mounted, the body control unit 27 does not allow the power supply unit 26 to provide electric power to the VBAT (B) terminal and the V33 (B) terminal.

In a mount-complete state, the signal level at the LDET (B) terminal is pulled down to low level, as has been explained (FIG. 3). Once the signal level at the LDET (B) terminal is detected to be low level, the body control unit 27 determines that the interchangeable lens 3 has been mounted. In addition, in the mount-complete state, the lock pin 142 will have moved into the lock pin receptacle portion 143, thereby turning on a lock pin detection switch (not shown) that interlocks with the lock pin 142. Upon detecting that the signal level at the LDET (B) terminal has shifted to low level and that the lock pin detection switch has been turned on, the body control unit 27 engages the power supply unit 26 to start providing electric power to the V33 (B) terminal, i.e., to supply a circuit system source voltage. It is to be noted that the camera body 2 does not need to include a lock pin detections switch. At a camera body 2 that does not include a lock pin detection switch, the power supply unit 26 will start supplying electric power to the V33 (B) terminal upon detecting that the signal level at the LDET (B) terminal has shifted to low level.

Once the power supply to the V33 (B) terminal starts, the source voltage is supplied to the lens control unit 37 at the interchangeable lens 3 through the V33 (L) terminal, and the lens control unit 37 thus starts operation. The lens control unit 37 having become engaged in operation permits initial communication through command data communication to be carried out with the body control unit 27. Once the lens control unit 37 permits initial communication, the body control unit 27 starts initial communication. Information exchanged in the initial communication includes a signal requesting power supply to the VBAT (L) terminal, transmitted by the lens control unit 37. In response to the signal requesting power supply to the VBAT (L) terminal, transmitted from the lens control unit 37 to the body control unit 27, the body control unit 27 provides a source voltage to the VBAT (B) terminal and initialization processing is executed for the camera body 2 and the interchangeable lens 3. In the initialization processing, information required in order to execute various operations in the camera 1, such as photographing operation and focus adjustment operation, is exchanged between the camera body 2 and the interchangeable lens 3 and the interchangeable lens is moved to a reference position.

As the user presses down a lock-release button (not shown) at the camera body 2 in a mount-complete state, the lock pin 142 moves out of the lock pin receptacle portion 143. As a result, it becomes possible to alter the positions of the body-side mount unit 201 and the lens-side mount unit 301 relative to each other. Once the user presses down the lock-release button (not shown), the lock pin detection switch, interlocking with the lock-release button, is turned off and the body control unit 27 controls the power supply unit 26 so as to stop the power supply to the VBAT (B) terminal and the V33 (B) terminal. As the interchangeable lens 3 is rotated in this state along the direction opposite from the mounting direction 144 indicated in FIG. 4A and FIG. 5, the plurality of lens-side terminals each come into contact with a plurality of body-side terminals in a sequence opposite from that described earlier.

It is to be noted that the power supply cessation does not need to interlock with a lock-release button operation. Namely, the body control unit 27 may control the power supply unit 26 to stop the power supply to the VBAT (B) terminal and the V33 (B) terminal upon sensing that the signal level at the LDET (B) terminal, no longer in contact with the LDET (L) terminal as the interchangeable lens 3 is rotated along the direction opposite from the mounting direction 144, has shifted from low level to high level. In this case, the number of required parts in the camera 1 can be reduced. As an alternative, the power supply unit 26 may stop power supply to the VBAT (B) terminal and the V33 (B) terminal upon sensing that the lock-release button has been pressed down and also that the signal level at the LDET (B) terminal has shifted from low level to high level. As a further alternative, the body control unit 27 may control the power supply unit 26 to stop power supply to the VBAT (B) terminal and the V33 (B) terminal upon sensing either that the lock-release button has been pressed down or that the signal level at the LDET (B) terminal has shifted from low level to high level.

As described above, while the interchangeable lens is being mounted at the camera body or being dismounted from the camera body (in a mount-incomplete state) the lens-side terminals each come into contact with body-side terminals other than the corresponding terminal with which it comes into contact in a mount-complete state. It is desirable that the lens-side terminals and the body-side terminals be disposed with a positional arrangement that minimizes any problems that may arise from such contact occurring during the mounting process and the dismounting process.

In the embodiment, the LDET (B) terminal among the plurality of body-side terminals is disposed at the leading end along the lens mounting direction (indicated by the arrow 144 in FIG. 4A). In other words, the LDET (B) terminal is disposed at the position furthest to the left among the terminals in the body-side terminal group in FIG. 4A, as explained earlier. The LDET (L) terminal among the plurality of lens-side terminals is likewise disposed at the leading end along the lens mounting direction (indicated by the arrow 144 in FIG. 5). This means that the LDET (L) terminal is disposed at the position furthest to the right among the terminals in the lens-side terminal group in FIG. 5 as described above. Thus, the LDET (B) terminal does not come into contact with any lens-side terminal other than the LDET (L) terminal before the interchangeable lens is completely mounted. For this reason, the signal level at the LDET (B) terminal does not erroneously shift to low level during the process of mounting the interchangeable lens and consequently, the lens is not erroneously recognized as mounted.

In the embodiment, the VBAT (B) terminal is disposed next to the LDET (B) terminal, i.e., at a second position from the leading end along the mounting direction. The VBAT (L) terminal is disposed next to the LDET (L) terminal, i.e., at a second position from the leading end along the mounting direction. Such a positional arrangement is adopted in order to minimize the number of lens-side terminals with which the VBAT (B) terminal on the camera body side comes into contact during the lens mounting process. The voltage applied to the VBAT (B) terminal is higher than the voltage applied to the other terminals, and thus, if the VBAT (B) terminal comes into contact with a terminal other than the VBAT (L) terminal under a condition in which a high voltage is erroneously applied to the VBAT (B) terminal due to a malfunction in the camera 1 or the like, the high voltage may place an unexpected load on the electric circuit within the interchangeable lens. In the embodiment, The VBAT (B) terminal is disposed at a position next to the LDET (B) terminal and thus only the LDET (L) terminal among the plurality of lens-side terminals comes into contact with the VBAT (B) terminal in a mount-incomplete state while mounting the interchangeable lens 3. The LDET (L) terminal is grounded via a resistor (the resistor R3 in FIG. 3) and for this reason, even if a high voltage is applied thereto from the VBAT (B) terminal, the camera 1 will remain unaffected.

In the embodiment, the PGND (B) terminal is disposed next to the VBAT (B) terminal, i.e., at a third position from the leading end along the mounting direction. The PGND (L) terminal is disposed next to the VBAT (L) terminal, i.e., at a third position from the leading end along the mounting direction. The high voltage supplied through the VBAT (B) terminal is accumulated as an electric charge in the capacitor C1 connected to the VBAT (L) terminal. As the interchangeable lens 3 is rotated along the dismounting direction (the direction opposite from the mounting direction 144), the VBAT (L) terminal first comes into contact with the PGND (B) terminal. The electric charge accumulated in the capacitor C1 is promptly discharged through the PGND (B) terminal, which is a ground terminal, without affecting the other circuits in the camera 1.

In the embodiment, the V33 (B) terminal is disposed next to the PGND (B) terminal, i.e., at a fourth position from the leading end along the mounting direction, and the GND (B) terminal is disposed next to the V33 (B) terminal, i.e. at a fifth position from the leading end. The V33 (L) terminal is disposed next to the PGND (L) terminal, i.e., at a fourth position from the leading end along the mounting direction, and the GND (L) terminal is disposed next to the V33 (L) terminal, i.e. at a fifth position from the leading end. The voltage supplied through the V33 (B) terminal is accumulated as an electric charge in the capacitor C2 connected to the V33 (L) terminal. As the interchangeable lens 3 is rotated along the dismounting direction (the direction opposite from the mounting direction 144), the V33 (L) terminal first comes into contact with the GND (B) terminal. The electric charge accumulated in the capacitor C2 is promptly discharged through the GND (B) terminal, which is a ground terminal, without affecting the other circuits in the camera 1.

The RDY (B) terminal is disposed next to the GND (B) terminal, i.e., at a sixth position from the leading end, the DATAB (B) terminal is disposed next to the RDY (B) terminal, i.e., at a seventh position from the leading end, the CLK (B) terminal is disposed next to the DATAB (B) terminal, i.e., at an eighth position from the leading end, the DATAL (B) terminal is disposed next to the CLK (B) terminal, i.e., at a ninth position from the leading end, the HCLK (B) terminal is disposed next to the DATAL (B) terminal, i.e., at a 10th position from the leading end and the HDATA (B) terminal is disposed next to the HCLK (B) terminal, i.e., at the trailing end.

The RDY (L) terminal is disposed next to the GND (L) terminal, i.e., at a sixth position from the leading end, the DATAB (L) terminal is disposed next to the RDY (L) terminal, i.e., at a seventh position from the leading end, the CLK (L) terminal is disposed next to the DATAB (L) terminal, i.e., at an eighth position from the leading end, the DATAL (L) terminal is disposed next to the CLK (L) terminal, i.e., at a ninth position from the leading end, the HCLK (L) terminal is disposed next to the DATAL (L) terminal, i.e., at a 10th position from the leading end and the HDATA (L) terminal is disposed next to the HCLK (L) terminal, i.e., at the trailing end.

Next, ramifications of noise attributable to communication lines configured with the individual body-side terminals and lens-side terminals will be described. Hotline communication, through which information is unidirectionally transmitted to the camera body 2 once the communication commences, is executed with a high frequency (executed repeatedly over a fairly short cycle). During hotline communication, a clock signal (H clock signal) originating on the interchangeable lens-side is transmitted from the HCLK (L) terminal to the HCLK (B) terminal. A clock signal, which repeatedly shifts between high level and low level over a short cycle, may become a source of significant noise with respect to another signal. Furthermore, since the clock signal (H clock signal) originating on the interchangeable lens-side, which is transmitted from the HCLK (L) terminal to the HCLK (B) terminal, is output from the interchangeable lens 3, noise which is carried erroneously in the clock signal cannot be detected by the camera body 2. This means that there is a possibility of the clock signal (H clock signal) flowing through the HCLK terminals becoming a noise source and that there is also a possibility of noise being included in the clock signal (H clock signal), which, in turn, may cause an erroneous operation of the camera 1. Examples of such an erroneous operation include the interchangeable lens erroneously detected as mounted and an incorrect decision made with respect to whether or not command data communication is enabled.

In the embodiment, the HCLK terminal is disposed at a position set apart from the VBAT terminal, which carries a high voltage. The voltage/current provided through the VBAT terminal to drive the lens drive unit 33 in the interchangeable lens 3 fluctuates in correspondence to the drive condition at the lens drive unit 33 and fluctuations in the voltage/current at the VBAT terminal may result in noise at other terminals. Accordingly, the VBAT terminal is disposed at a distance away from the HCLK terminal so as to minimize the extent to which noise attributable to fluctuations in the voltage/current at the VBAT terminal affects the clock signal (H clock signal). Namely, noise is not allowed to enter the clock signal (H clock signal).

As explained earlier, the RDY terminal is used to indicate whether or not command communication is enabled. In the embodiment, the HCLK terminal, which may become a noise source, is disposed at a distance away from the RDY terminal. As a result, it is ensured that noise attributable to the clock signal (H clock signal) does not affect the signal transmitted through the RDY terminal.

In addition, the HDATA terminal and the DATAL terminal are disposed next to the HCLK terminal on the two sides thereof. This positional arrangement makes it possible to minimize any adverse effect of noise from the HCLK terminal on terminals other than the HDATA terminal and the DATAL terminal. Signals transmitted via the HDATA terminal and the DATAL terminal do not fluctuate as much as the clock signal (H clock signal). Thus, any adverse effect attributable to fluctuation of the clock signal (H clock signal) on terminals other than the HDATA terminal and the DATAL terminal can be suppressed.

Through command data communication, information is bidirectionally transmitted/received between the camera body 2 and the interchangeable lens 3, as explained earlier. For command data communication, a clock signal (C clock signal) originating on the camera body-side is transmitted from the CLK (B) terminal to the CLK (L) terminal. The clock signal (C clock signal) transmitted through the CLK terminal, too, may become a noise source for the same reason as that explained above.

In addition, if noise enters the clock signal (C clock signal), an error will occur in the command data communication. Accordingly, the CLK terminal is disposed at a position away from the VBAT terminal, to which a high voltage is applied in the embodiment. The voltage/current provided via the VBAT terminal to drive the lens drive unit 33 in the interchangeable lens 3 fluctuates in correspondence to the drive condition at the lens drive unit 33 and fluctuations in the voltage/current at the VBAT terminal may result in noise at other terminals. Accordingly, the VBAT terminal is disposed at a distance away from the CLK terminal so as to minimize the extent to which noise attributable to fluctuations in the voltage/current at the VBAT terminal affects the clock signal (C clock signal). Namely, it is arranged that noise is not allowed to enter the clock signal (C clock signal).

Furthermore, the CLK terminal is disposed at a position set apart from the RDY terminal used to indicate whether or not command communication is enabled, so as not to be adjacent to the RDY terminal.

Moreover, if the HCLK terminal and the CLK terminal are disposed adjacent to each other, one clock signal may affect the other clock signal, resulting in an occurrence of noise. In the embodiment, the DATAL terminal is disposed between the CLK terminal and the HCLK terminal. In addition, the DATAB terminal is disposed between the CLK terminal and the RDY terminal. Namely, the DATAL terminal and the DATAB terminal are disposed next to the CLK terminal on the two sides thereof. This positional arrangement makes it possible to minimize the extent to which noise originating at the CLK terminal affects the camera 1. Signals transmitted via the DATAL terminal and the DATAB terminal do not fluctuate as much as the clock signal (C clock signal), and thus, any adverse effect attributable to fluctuation of the clock signal (C clock signal) on terminals other than the DATAL terminal and the DATAB terminal can be suppressed.

By disposing the DATAL terminal between the CLK terminal and the HCLK terminal, the extent to which the clock signal (H clock signal) at the HCLK terminal is adversely affected by fluctuations in the clock signal (C clock signal) at the CLK terminal and the extent to which the clock signal (C clock signal) at the CLK terminal is adversely affected by fluctuations in the clock signal (H clock signal) at the HCLK terminal can be minimized, since the signal passing through the DATAL terminal does not fluctuate as much as the clock signal (C clock signal) at the CLK terminal or the clock signal (H clock signal) at the HCLK terminal.

As explained earlier, the signal level at the RDY terminal needs to be determined in order to carry out command data communication. This means that since the signal level at the RDY terminal indicates whether or not command data communication can be carried out, noise in the signal is bound to significantly affect photographing operations. For instance, a situation may arise in which noise causes the body control unit 27 to erroneously ascertain that communication is enabled even when command data communication cannot be carried out. In this situation, even though the lens control unit 37 cannot actually receive command data, the body control unit 27 will transmit command data and erroneously assume that control instructions in the command data are executed in the interchangeable lens 3. However, the control instructions in the command data having been erroneously transmitted will not be executed, since the lens control unit 37 cannot receive the command data. As a result, a problem will occur in the operation of the camera 1. For this reason, it is necessary to ensure that noise does not enter the signal transmitted through the RDY terminal. It is preferable that terminals carrying relatively stable signals, i.e., signals with small shifts in the signal level per unit time, be disposed next to an RDY terminal on the two sides thereof, in order to ensure that noise does not enter the signal at the RDY terminal. In the embodiment, the GND terminal and the DATAB terminal are disposed next to the RDY terminal on the two sides thereof. The GND terminal is a stable terminal assuming the ground potential, and the DATAB terminal is also a stable terminal through which a stable signal, in comparison to the signals passing through the CLK terminal and the HCLK terminal is transmitted. By adopting this positional arrangement, the extent to which the signal at the RDY terminal is affected by noise can be minimized.

Electric power (source voltage) provided from the VBAT (B) terminal to the VBAT (L) terminal is used to drive the actuator (e.g., a stepping motor) in the lens drive unit 33 at the interchangeable lens 3. This means that the electric current flowing through the VBAT terminals fluctuates greatly as the actuator shifts from a drive state to a non-drive state or vice versa. Such fluctuations in the electric current may become a cause of noise in signals passing through other terminals. In the embodiment, the VBAT terminals are each disposed at a position set apart from the corresponding RDY terminal, DATAB terminal, CLK terminal and DATAL terminal used for command data communication and also set apart from the corresponding HCLK terminal and HDATA terminal used for hotline communication. In addition, the GND terminal, the V33 terminal and the PGND terminal are disposed between the VBAT terminal and the terminals used for purposes of communication listed above. As a result, the extent to which noise attributable to fluctuations in the electric current flowing through the VBAT terminal affects data communication can be minimized.

The positional arrangement of the terminals to minimize the adverse effects of noise, as described above, is summarized below.

The RDY terminal is disposed away from both the VBAT terminal and the HCLK terminal at which noise is likely to occur, i.e., at a position that is adjacent to neither the VBAT terminal nor the HCLK terminal. Through these measures, the adverse effect of noise on the RDY terminal used to indicate whether or not command data communication is enabled can be minimized.

The HCLK terminal at which noise is likely to occur is disposed between the HDATA terminal and the DATAL terminal, whereas the CLK terminal is disposed between the DATAL terminal and the DATAB terminal. Namely, the HDATA terminal, the HCLK terminal, the DATAL terminal, the CLK terminal and the DATAB terminal are disposed in this order, starting from the trailing end along the mounting direction. As a result, the extent to which noise attributable to a clock signal adversely affects the RDY terminal or the like can be minimized.

Moreover, the terminal group used for power supply and the terminal group engaged in communication are disposed away from each other on the two sides of the RDY terminal so as to minimize the adverse effect of noise. In more specific terms, on the leading-end side along the mounting direction relative to the RDY terminal, the VBAT terminal, the PGND terminal, the V33 terminal and the GND terminal, used for purposes of power supply, are disposed in this order starting from the leading end, and on the trailing-end side along the mounting direction relative to the RDY terminal, the DATAB terminal, the CLK terminal, the DATAL terminal, the HCLK terminal and the HDATA terminal used for communication are disposed in this order starting from the leading-end side. Through these measures, the extent to which the communication terminals are affected by the power supply system terminal group, which includes the VBAT terminal, can be minimized. In addition, the extent to which noise from the power supply system terminal group, which includes the VBAT terminal, and noise from the communication terminal group, which includes the HCLK terminal and the CLK terminal, affects the RDY terminal can be minimized.

The HCLK terminal, through which a clock signal originating on the interchangeable lens-side is transmitted in hotline communication, is disposed at a position further away from the corresponding VBAT terminal than the CLK terminal through which a clock signal originating on the camera body side is transmitted for command data communication. The rationale for this positional arrangement is that while the clock signal transmitted to the interchangeable lens 3 through the CLK terminals is output by the body control unit 27 via the first body communication unit 28, noise in the clock signal output from the interchangeable lens 3 via the second lens communication unit 39 and transmitted through the HCLK (L) terminal to the camera body 2 will affect the camera 1 to a greater extent since noise in the clock signal transmitted from the interchangeable lens will cause the body control unit 27 to make an erroneous decision.

The HCLK terminal is disposed at a position set apart from the VBAT terminal by a greater distance than the GND terminal. In addition, the PGND terminal is disposed between the GND terminal and the VBAT terminal. This positional arrangement makes it possible to shield the HCLK terminal, through which a clock signal used in hotline communication is transmitted, from noise originating at the VBAT terminal.

The CLK terminal is disposed at a position set apart from the VBAT terminal by a greater distance than the GND terminal. In addition, the PGND terminal is disposed between the GND terminal and the VBAT terminal. This positional arrangement makes it possible to shield the CLK terminal, through which a clock signal used in command data communication is transmitted, from noise originating at the VBAT terminal.

The interchangeable lens 3 and the camera body 2 are engaged in command data communication through which an RDY signal, a CLK signal, a DATAB signal and a DATAL signal are exchanged via the first lens communication unit 38 and the first body communication unit 28 as described above by using the terminal groups assuming the positional arrangement described above. In addition, the interchangeable lens 3 and the camera body 2 are engaged in hotline communication through which an HCLK signal and an HDATA signal are transmitted via the second lens communication unit 39 and the second body communication unit 29. It is to be noted that command data communication is carried out through a communication path separate from the communication path through which hotline communication is carried out and thus, command data communication and hotline communication can be executed concurrently. Namely, even while the first lens communication unit 38 is engaged in command data communication with the first body communication unit 28, the second lens communication unit 39 is able to carry out hotline communication with the second body communication unit 29 as needed. Furthermore, even while the second lens communication unit 39 is engaged in hotline communication with the second body communication unit 29, the first lens communication unit 38 is able to carry out command data communication with the first body communication unit 28 as needed.

Positional Arrangement of Terminals Taking into Consideration Terminal Wear

The following is a description of how the various terminals come into contact with one another when the interchangeable lens is mounted at or dismounted from the camera body 2.

When the interchangeable lens 3 is being mounted at the camera body 2, a body-side terminal comes into contact with lens-side terminals one after another. Likewise, it comes into contact with lens-side terminals when the interchangeable lens 3 is being dismounted from the camera body 2. In other words, the body-side terminals constituted with pins projecting out from the body-side connection unit 202 each slide against lens-side terminals constituted with exposed conductive contact surfaces one after another. Since a plurality of interchangeable lenses can be mounted at a single camera body, the body-side terminals tend to become worn more readily than the lens-side terminals. In particular, a body-side terminal disposed at a position closer to the trailing end along the mounting direction of the interchangeable lens 3, which slides against a greater number of lens-side terminals, is bound to be subjected to greater friction and become worn to a greater extent. This means that a body-side terminal located closer to the trailing end tends to become more worn at the tip of the pin compared to a body-side terminal disposed at a position closer to the leading end. Wear at a body-side terminal affects contact with the corresponding lens-side terminal, which may, in turn, lead to unstable data communication.

In the embodiment, the LDET (B) terminal is disposed at the leading end position along the mounting direction and thus, the LDET (B) terminal is bound to be the least worn terminal. As a result, since good contact between the LDET (B) terminal and the LDET (L) terminal is assured, there is less likelihood of erroneously sensing the interchangeable lens 3 to be in a mounted or dismounted state.

As explained earlier, the CLK (B) terminal and the HCLK (B) terminal are disposed at positions set apart from the VBAT terminal so as to minimize the adverse effect of noise on communication. Namely, the CLK (B) terminal and the HCLK (B) terminal are disposed on the trailing-end side away from the VBAT terminal disposed at the second position from the leading-end along the mounting direction. This means that the CLK (B) terminal and HCLK (B) terminal are likely to be worn to a greater extent compared to the LDET (B) terminal and the VBAT (B) terminal. In the embodiment, the CLK (B) terminal and the HCLK (B) terminal are disposed near or just beside the body-side first claw portion 129a. Namely, the CLK (B) terminal and the HCLK (B) terminal are disposed at positions closer to the inner circumferential edge located on the inner circumferential side of the body-side first claw portion 129a, compared to the VBAT (B) terminal. In more specific terms, the distance between the CLK (B) terminal and the inner circumferential edge of the body-side first claw portion 129a is smaller than the distance between the VBAT (B) terminal and the inner circumferential edge of the body-side first claw portion 129a, and the distance between the HCLK (B) terminal and the inner circumferential edge of the body-side first claw portion 129a is smaller than the distance between the VBAT (B) terminal and the inner circumferential edge of the body-side first claw portion 129a. As explained earlier, the first plate spring 141a is disposed on the back side of the body-side first claw portion 129a and the lens-side first claw portion 139a is pressed toward the +Z direction (see FIG. 1) via the first plate spring 141a.

In relation to the first plate spring 141a, too, the distance between the CLK (B) terminal and the first plate spring 141a and the distance between the HCLK (B) terminal and the first plate spring 141a are both smaller than the distance between the VBAT (B) terminal and the first plate spring 141a. This positional relationship with regard to the VBAT (B) terminal is also applicable with respect to the LDET (B) terminal, i.e., the distance between the CLK (B) terminal and the first plate spring 141a and the distance between the HCLK (B) terminal and the first plate spring 141a are both smaller than the distance between the LDET (B) terminal and the first plate spring 141a. The CLK (B) terminal and the HCLK (B) terminal disposed by adopting this positional arrangement are pressed against the corresponding lens-side terminals with more force compared to the VBAT (B) terminal and the LDET (B) terminal.

On the lens-side, too, the CLK (L) terminal and the HCLK (L) terminal are disposed at positions closer to the inner circumferential edge of the lens-side first claw portion 139a compared to the VBAT (L) terminal. Namely, the distance between the CLK (L) terminal and the inner circumferential edge of the lens-side first claw portion 139a is smaller than the distance between the VBAT (L) terminal and the inner circumferential edge of the lens-side first claw portion 139a and the distance between the HCLK (L) terminal and the inner circumferential edge of the lens-side first claw portion 139a is smaller than the distance between the VBAT (L) terminal and the inner circumferential edge of the lens-side first claw portion 139a. This means that in a mount-complete state, the CLK (L) terminal and the HCLK (L) terminal located near the lens-side first claw portion 139a are pressed against the corresponding body-side terminals via the first plate spring 141a.

The positional relationship with respect to the VBAT (L) also applies with respect to the LDET (L) terminal and thus, the distance between the CLK (L) terminal and the first plate spring 141a and the distance between the HCLK (L) terminal and the first plate spring 141a are both smaller than the distance between the LDET (L) terminal and the first plate spring 141a in a mount-complete state. As a result, greater force is applied in a mount-complete state to press the CLK (L) terminal and the HCLK (L) terminal toward the corresponding body-side terminals compared to the force applied to the LDET (L) terminal. Thus, good contact can be sustained even when the CLK (B) terminal or the HCLK (B) terminal becomes worn, which, in turn, makes it possible to stabilize the respective clock signals to assure stable data communication. Furthermore, even if the camera body 2 or the interchangeable lens 3 is subjected to a shock while sustaining a mount-complete state, the contact between the CLK (B) terminal and the CLK (L) terminal and the contact between the HCLK (B) terminal and the HCLK (L) terminal are maintained.

Even when the lens-side first claw portion 139a includes a notch portion, the total area made up with the projecting portion and the notch portion disposed so as to face opposite the body-side first claw portion 129a constitutes a lens-side first claw portion. Such a notch portion may be formed by dividing the lens-side claw portion into two or more segments separated along the circumferential direction, by notching part of the lens-side claw portion, or by notching at least part of the lens-side claw portion so as to reduce the length of the part measured along the radial direction. In addition, the length of the lens-side claw portion, measured along the circumferential direction, may be adjusted as long as it is allowed to pass through the corresponding body-side through portion. The same principle applies to the lens-side second claw portion 139b, the lens-side third claw portion 139c and the lens-side fourth claw portion 139d. Moreover, the thickness of the cylindrical portion, measured along the radial direction, may be adjusted as needed, and the cylindrical portion may adopt a shape with at least part thereof projecting further inward relative to the cylindrical portion in the embodiment.

As explained above, the CLK (B) terminal and the HCLK (B) terminal are bound to become worn to a greater extent compared the LDET (B) terminal and the VBAT (B) terminal. In the embodiment, the CLK (B) terminal and the HCLK (B) terminal are disposed near the body-side first claw portion 129a. Namely, the CLK (B) terminal and the HCLK (B) terminal are disposed at positions closer to the inner circumferential edge of the body-side first claw portion 129a than the LDET (B) terminal and the VBAT (B) terminal. This means that the distance between the CLK (B) terminal and the inner circumferential edge of the body-side first claw portion 129a is smaller than the distance between the LDET (B) terminal or the VBAT (B) terminal and the inner circumferential edge of the body-side first claw portion 129a, and also, the distance between the HCLK (B) terminal and the inner circumferential edge of the body-side first claw portion 129a is smaller than the distance between the LDET (B) terminal or the VBAT (B) terminal and the inner circumferential edge of the body-side first claw portion 129a. As explained earlier, the first plate spring 141a is present on the back side of the body-side first claw portion 129a and the lens-side first claw portion 139a is pressed toward the +Z direction (see FIG. 1) by the first plate spring 141a. In relation to the first plate spring 141a, too, the distance between the CLK (B) terminal and the first plate spring 141a and the distance between the HCLK (B) terminal and the first plate spring 141a are both smaller than the distance between the LDET (B) terminal or the VBAT (B) terminal and the first plate spring 141a.

On the lens-side, too, the CLK (L) terminal and the HCLK (L) terminal are disposed at positions closer to the inner circumferential edge of the lens-side first claw portion 139a compared to the LDET (L) terminal and the VBAT (L) terminal. In other words, the distance between the CLK (L) terminal and the inner circumferential edge of the lens-side first claw portion 139a is smaller than the distance between the LDET (L) terminal or the VBAT (L) terminal and the inner circumferential edge of the lens-side first claw portion 139a, and the distance between the HCLK (L) terminal and the inner circumferential edge of the lens-side first claw portion 139a is smaller than the distance between the LDET (L) terminal or the VBAT (L) terminal and the inner circumferential edge of the lens-side first claw portion 139a. As a result, the CLK (L) terminal and the HCLK (L) terminal located near the lens-side first claw portion 139a are pressed against the corresponding body-side terminals by the first plate spring 141a. Thus, greater force is applied to press the CLK (B) terminal and the HCLK (B) terminal toward the corresponding lens-side terminals compared to the force applied to the LDET (B) terminal and the VBAT (B) terminal. Consequently, good contact can be sustained even when the CLK (B) terminal or the HCLK (B) terminal becomes worn, to assure stable data communication. Furthermore, even if the camera body 2 or the interchangeable lens 3 is subjected to a shock while sustaining a mount-complete state, the contact between the CLK (B) terminal and the corresponding lens-side terminal and the contact between the HCLK (B) terminal and the corresponding lens-side terminal are maintained.

In the embodiment, the CLK (B) terminal and the HCLK (B) terminal are disposed also close to the body-side fourth claw portion 129d. In other words, the CLK (B) terminal and the HCLK (B) terminal are disposed at positions closer to the body-side fourth claw portion 129d compared to the VBAT (B) terminal and the LDET (B) terminal. This means that the distance between the CLK (B) terminal and the body-side fourth claw portion 129d is smaller than the distance between the VBAT (B) terminal or the LDET (B) terminal and the body-side fourth claw portion 129d, and the distance between the HCLK (B) terminal and the body-side fourth claw portion 129d is smaller than the distance between the VBAT (B) terminal or the LDET (B) terminal and the body-side fourth claw portion 129d. As explained earlier, the fourth plate spring 141d is present on the back side of the body-side fourth claw portion 129d, and the lens-side fourth claw portion 139d is pressed toward the +Z direction (see FIG. 1) by the fourth plate spring 141d. As a result, the CLK (B) terminal and the HCLK (B) terminal located close to the lens-side fourth claw portion 139d are pressed against the corresponding lens-side terminals with greater force and in a more stable manner via the first plate spring 141a and the fourth plate spring 141d, compared to the VBAT (B) terminal and the LDET (B) terminal.

The distance between the CLK (B) terminal and the body-side first claw portion 129a (a similar principle applies with respect to the distance between the CLK (B) terminal and the body-side fourth claw portion 129d, although an explanation is not provided) mentioned above refers to the distance in a straight line between one end of the body-side first claw portion 129a and the CLK (B) terminal, but the distance may be alternatively defined as the distance in a straight line between the other end of the body-side first claw portion 129a and the CLK (B) terminal. As a further alternative, the distance between the CLK (B) terminal and the body-side first claw portion 129a may be defined as the straight line distance between the halfway position in the body-side first claw portion 129a along the circumference of the body-side mount unit 201 and the CLK (B) terminal. The distance between another body-side terminal, such as the HCLK (B) terminal, the VBAT (B) terminal or the LDET (B) terminal and the body-side first claw portion 129a is likewise a straight line distance between the terminal and the body-side first claw portion 129a. In addition, the distance between the first plate spring 141a (the fourth plate spring 141d, as well) and a body-side terminal is likewise a straight line distance.

It is to be noted that the distance between the CLK (B) terminal and the body-side first claw portion 129a (a similar principle applies with respect to the distance between the CLK (B) terminal and the body-side fourth claw portion 129d, although an explanation is not provided) mentioned above may refer to the distance measured along the circular arc connecting one end of the body-side first claw portion 129a and the CLK (B) terminal along the circumference of the body-side mount unit 201, or it may be alternatively defined as the distance measured along the circular arc connecting the other end of the body-side first claw portion 129a and the CLK (B) terminal. As a further alternative, the distance between the CLK (B) terminal and the body-side first claw portion 129a may be defined as the distance measured along the circular arc connecting the halfway position in the body-side first claw portion 129a along the circumference of the body-side mount unit 201 and the CLK (B) terminal. The distance between another body-side terminal, such as the HCLK (B) terminal, the VBAT (B) terminal or the LDET (B) terminal and the body-side first claw portion 129a may also be defined as the distance measured along the circular arc connecting the terminal and the body-side first claw portion 129a. In addition, the distance between the first plate spring 141a (the fourth plate spring 141d, as well) and a body-side terminal may likewise be defined as the distance measured along the circular arc.

While a description above relates to the camera body 2, a similar description applies to the interchangeable lens 3. In the embodiment, the CLK (L) terminal and the HCLK (L) terminal are disposed near the lens-side first claw portion 139a. In other words, the CLK (L) terminal and the HCLK (L) terminal are disposed at positions closer to the lens-side first claw portion 139a compared to the VBAT (L) terminal and the LDET (L) terminal. This means that the distance between the CLK (L) terminal and the lens-side first claw portion 139a is smaller than the distance between the VBAT (L) terminal or the LDET (L) terminal and the lens-side first claw portion 139a, and the distance between the HCLK (L) terminal and the lens-side first claw portion 139a is smaller than the distance between the VBAT (L) terminal or the LDET (L) terminal and the lens-side first claw portion 139a. The lens-side first claw portion 139a is pressed toward the +Z direction (see FIG. 1) by the first plate spring 141a located on the body-side. Thus, the CLK (L) terminal and the HCLK (L) terminal located near the lens-side first claw portion 139a are pressed toward the corresponding body-side terminals with greater force imparted by the first plate spring 141a, compared to the VBAT (L) terminal and the LDET (L) terminal, in much the same way as that described earlier.

In the embodiment, the CLK (B) terminal and the HCLK (B) terminal are disposed within a fan-shaped area (ranging over an angle 50) defined by the central position of the opening at the body-side mount unit 201 (i.e., the position of the optical axis L of the interchangeable lens 3) and the body-side first claw portion 129a assuming a circular arc shape as shown in FIG. 4A. In other words, the CLK (B) terminal and the HCLK (B) terminal are disposed inside a triangular area defined by the central position of the opening at the body-side mount unit 201 (i.e., the position of the optical axis L of the interchangeable lens 3) and the two ends of the body-side first claw portion 129a located on the inner circumferential side. That is, while the body-side first claw portion 129a is not present on a line extending from a one-point chain line 151 connecting the central position of the opening at the body-side mount unit 201 and the LDET (B) terminal, the body-side first claw portion 129a is present on a line extending from a one-point chain line 152 connecting the central position of the opening at the body-side mount unit 201 and the HCLK (B) terminal and the body-side first claw portion 129a is present on a line extending from a one-point chain line 153 connecting the central position of the opening at the body-side mount unit 201 and the CLK (B) terminal. As a result, the CLK (B) terminal and the HCLK(B) terminal are pressed against the corresponding lens-side terminals with greater force in a mount-complete state compared to the LDET (B) terminal.

The CLK (L) terminal and the HCLK (L) terminal are disposed within a fan-shaped area (ranging over an angle 60) defined by the central position of the opening at the lens-side mount unit 301 (i.e., the position of the optical axis L of the interchangeable lens 3) and the lens-side first claw portion 139a assuming a circular arc shape, as shown in FIG. 5. In other words, the CLK (L) terminal and the HCLK (L) terminal are disposed inside a triangular area defined by the central position of the opening at the lens-side mount unit 301 (i.e., the position of the optical axis L of the interchangeable lens 3) and the two ends of the lens-side first claw portion 139a located on the outer circumferential side. That is, while the lens-side first claw portion 139a is not present on a line extending from a one-point chain line 161 connecting the central position of the opening at the lens-side mount unit 301 and the LDET (L) terminal, the lens-side first claw portion 139a is present on a line extending from a one-point chain line 162 connecting the central position of the opening at the lens-side mount unit 301 and the HCLK (L) terminal and the lens-side first claw portion 139a is present on a line extending from a one-point chain line 163 connecting the central position of the opening at the lens-side mount unit 301 and the CLK (L) terminal. As a result, the CLK (L) terminal and the HCLK (L) terminal contact the corresponding body-side terminals in a more stable manner compared to the LDET (L) terminal in a mount-complete state. Namely, greater force is applied to the CLK (L) terminal and the HCLK (L) terminal to press them toward the corresponding body-side terminals than to the LDET (L) terminal. Thus, even when the tips of the CLK (B) terminal and the HCLK (B) terminal have become worn, clock signals can be exchanged between the camera body 2 and the interchangeable lens 3 in a stable manner.

It is to be noted that while the explanation has been given on the CLK (B) terminal, the CLK (L) terminal, the HCLK (B) terminal and the HCLK (L) terminal, the similar concept may apply to the other communication system terminals, i.e., the HDATA (B) terminal, the HDATA (L) terminal, the DATAL (B) terminal, the DATAL (L) terminal, the DATAB (B) terminal and the DATAB (L) terminal. Namely, the HDATA (B) terminal, the DATAL (B) terminal and the DATAB (B) terminal are disposed at positions closer (at shorter distances) to the body-side first claw portion 129a and the first plate spring 141a, compared to the LDET (B) terminal and the VBAT (B) terminal. As a result, the HDATA (B) terminal, the DATAL (B) terminal and the DATAB (B) terminal are pressed toward the corresponding lens-side terminals with greater force compared to the VBAT (B) terminal and the LDET (B) terminal, so as to maintain good contact with the lens-side terminals. In addition, the HDATA (L) terminal, the DATAL (L) terminal and the DATAB (L) terminal are disposed at positions closer (at shorter distances) to the lens-side first claw portion 139a and the first plate spring 141a compared to the LDET (L) terminal and the VBAT (L) terminal. As a result, the HDATA (L) terminal, the DATAL (L) terminal and the DATAB (L) terminal are pressed toward the corresponding body-side terminals with greater force compared to the VBAT (L) terminal and the LDET (L) terminal, so as to maintain good contact with the body-side terminals.

Through command data communication, values representing communication specifications or communication conditions for hotline communication are transmitted and received between the interchangeable lens 3 and the camera body 2. Such a value will be referred to as a generation. A value representing a generation may be otherwise referred to as generation information. While a generation is normally represented by an integer equal to or greater than 0, it may instead be represented by a decimal number. Furthermore, a generation may be referred to as a grade. FIG. 6 is a chart presenting examples of generations. Different generations represent sets of communication specifications different from one another. The communication specifications may be otherwise referred to as a communication system, a communication method or a communication standard. The communication specifications include at least one item related to communication, that is, at least one condition under which communication is carried out. The sets of communication specifications in the examples presented in FIG. 6 each include three communication-related items, i.e., a hotline communication speed, a hotline communication interval and a quantity of sets of data transmitted through hotline communication. The communication specifications designated as a generation do not need to include these three items and may instead include one or two items selected from these three items.

Such generations may be, for instance, first through fourth generations different from one another. The sets of communication specifications designated as the various generations are different from one another. However, the sets of communication specifications designated as different generations may include an item indicating matching values. It is to be noted that a generation bearing a higher number is referred to as a higher-order generation (grade). For instance, the fourth generation is a higher-order generation (grade) relative to the third generation. Furthermore, a generation may represent another set of specifications in addition to the communication specifications. In the examples presented in FIG. 6, each generation represents specifications related to a sampling interval for data generation, in addition to the communication specifications. Moreover, generations may further represent, for instance, specifications related to vibration correction function/capability in addition to the specifications described above.

The communication speed is the rate at which data are communicated through hotline communication (i.e., clock frequency). In other words, the communication speed is the speed at which data are transferred from the second lens communication unit 39 to the second body communication unit 29. The communication interval is the time interval at which data are transferred through hotline communication. The data transmitted from the interchangeable lens 3 to the camera body 2 through hotline communication may be information pertaining to focus lens drive (information related to the position of the focus lens and the like), information pertaining to anti-vibration lens drive (information related to the position of the anti-vibration lens and the like), information pertaining to the zoom lens (information pertaining to the state of the zoom lens, focal length information and the like), and information pertaining to drive of the aperture stop 32 (information related to the F-number). In addition, the sampling interval is a time interval over which data to be transmitted through hotline communication are sampled. Such a time interval may be, for instance, the interval over which the lens control unit 37 samples pulse signals generated by the lens position detection unit 34.

The communication specifications designated as the first generation in FIG. 6 indicate V1 (in units of, for instance, MHz) for the communication speed, T1 (indicated in units of, for instance, msec) for the communication interval and N1 (integer) for the number of sets of data. A generation bearing a higher number (higher grade) indicates a higher communication speed, a shorter communication interval and a greater number of sets of data. Namely, the communication specifications designated as the second generation indicate V2 higher than V1 for the communication speed, T2 shorter than T1 for the communication interval and N2 greater than N1 for the number of sets of data.

The communication specifications designated as the third generation indicates V3 higher than V2 for the communication speed, T3 shorter than T2 for the communication interval and N3 greater than N2 for the number of sets of data. The communication specifications designated as the fourth generation indicate V4 higher than V3 for the communication speed, T4 shorter than T3 for the communication interval and N4 greater than N3 for the number of sets of data. It is to be noted that V1 through V4, T1 through T4 and N1 through N4 may each be a specific fixed value or they may be values falling into a specific range. For instance, the communication speed V1 may be a predefined fixed value (e.g., 2.5 MHz) or it may be a predefined communication speed range v1 through v2 (e.g., 2 through 8 MHz). In addition, the communication interval T1 may be a predefined fixed value (e.g., 1 msec) or it may be a predefined communication interval range (0.5 through 2 msec).

The data transmitted through hotline communication may be information pertaining to focus lens drive, anti-vibration lens drive, aperture stop drive or the state of the zoom lens, as explained earlier. When the number of sets of data is N1, for instance, the data transmitted through hotline communication is information pertaining to focus lens drive. When the number of sets of data is N2, information pertaining to anti-vibration lens drive is also transmitted through hotline communication, in addition to information pertaining to focus lens drive. When the number of sets of data is N3, information pertaining to the drive of the aperture stop 32, as well as information related focus lens drive and information pertaining to anti-vibration lens drive, is transmitted through hotline communication. When the number of sets of data is N4, information pertaining to the zoom lens state is transmitted through hotline communication, in addition to information pertaining to focus lens drive, information pertaining to anti-vibration lens drive and information pertaining to drive of the aperture stop 32.

In the examples presented in FIG. 6 described above, the number of sets of data transmitted through hotline communication is included in the communication specifications designated as a given generation. However, the number of sets of data does not need to be included in the communication specifications and instead may be separately represented by the corresponding generation. In addition, the generations each represent a specific number of sets of data in the examples described earlier. As an alternative, each generation may indicate the data that are transmitted through hotline communication. Namely, a generation may indicate the data to be transmitted through hotline communication, such as information pertaining to focus lens drive (information related to the position of the focus lens and the like), information pertaining to anti-vibration lens drive (information related to the position of the anti-vibration lens and the like), information pertaining to the zoom lens (information related to the zoom lens state, focal length information and the like), and information pertaining to drive of the aperture stop 32 (information pertaining to the F-number and the like).

In addition, the sampling interval specifications designated as the first generation indicate S1 (in units of, for instance msec) in the example in FIG. 6. The sampling interval specifications designated as the second generation indicate S2, shorter than S1, the sampling interval specifications designated as the third generation indicate S3, shorter than S2, and the sampling interval specifications designated as the fourth generation indicate S4, shorter than S3. S1 through S4 may each be a predefined fixed value or may each be values falling into a predefined range.

It is to be noted that all of the items included in the communication specifications and other specifications do not need to indicate different values from one generation (grade) to another (grade) among the first through fourth generations, and instead, a single item or a plurality of items corresponding to a given generation may indicate values different from those in another generation. For instance, while the communication speed increases in a higher generation, the communication interval and the number of sets of data may remain unchanged in the higher generation. In addition, the various hotline communication generations may each represent sampling interval specifications and specifications related to vibration correction function/capability, in addition to the communication specifications. In such a case, only one item included in the communication specifications may indicate different values from one generation to another, two or three items included in the communication specifications may indicate different values from one generation to another, or the sampling interval specifications and the specifications related to the vibration correction function/capability in addition to the communication specifications, may all indicate different values from one generation to another.

Next, the relationship among the communication specifications designated as specific generations, the interchangeable lens 3 and the camera body 2 will be explained. An interchangeable lens 3 and a camera body 2 that are able to carry out hotline communication according to the communication specifications designated as the first generation will be respectively referred to as a first-generation interchangeable lens 3 and a first-generation camera body 2. In addition, an interchangeable lens 3 and a camera body 2 that are able to carry out hotline communication according to the communication specifications designated as the second generation will be respectively referred to as a second-generation interchangeable lens 3 and a second-generation camera body 2. Likewise, an interchangeable lens 3 and a camera body 2 that are able to carry out hotline communication in conformance to the communication specifications designated as the third generation will be respectively referred to as a third-generation interchangeable lens 3 and a third-generation camera body 2. An interchangeable lens 3 and a camera body 2 that are able to carry out hotline communication in conformance to the communication specifications designated as the fourth generation will be respectively referred to as a fourth-generation interchangeable lens 3 and a fourth-generation camera body 2.

It is to be noted that in the present embodiment, a plurality of interchangeable lenses and a plurality of camera bodies having functions that enable them to carry out communication in conformance to the common communication specifications categorized as the "communication specifications designated as the first generation" are collectively referred to as, a "first-generation interchangeable lens" and a "first-generation camera body" respectively. This concept applies in relation to interchangeable lenses and camera bodies supporting the communication specifications designated as the second generation, the third generation and the fourth generation. The "communication specifications designated as the first generation" may be otherwise referred to as "first communication specifications". In addition, the "first-generation interchangeable lens" and the "first-generation camera body" may be respectively referred to as a "first interchangeable lens" and a "first camera body".

It is to be noted that an interchangeable lens 3 and a camera body 2 corresponding to the communication specifications designated as a given generation are also able to carry out hotline communication in conformance to the communication specifications designated as a preceding generation (a generation bearing a lower number, i.e., a lower grade). This means that while a first-generation interchangeable lens 3 and a first-generation camera body 2 carry out hotline communication in conformance to the communication specification represented by the first generation, a second-generation interchangeable lens 3 and a second-generation camera body 2 are each able to support the communication specifications designated as the first generation as well as the communication specifications designated as the second-generation. In addition, a third-generation interchangeable lens 3 and a third-generation camera body 2 are each able to support the communication specifications designated as the first through third generations and a fourth-generation interchangeable lens 3 and a fourth-generation camera body 2 are each able to support the communication specifications designated as the first through fourth generations. If a fourth-generation interchangeable lens 3 and a third-generation camera body 2 are used in combination, hotline communication can be carried out in conformance to any of the communication specifications they commonly support, i.e., the communication specifications designated as the third generation, the communication specifications designated as the second generation and the communication specifications designated as the first generation. However, since the camera body 2 does not support the communication specifications designated as the fourth generation, they cannot carry out hotline communication in conformance to the communication specifications designated as the fourth generation, or hotline communication in conformance to the communication specifications designated as the fourth generation will not be commenced.

FIG. 7 presents a chart indicating generations each representing the communication specifications in conformance to which hotline communication is carried out by an interchangeable lens 3, corresponding to one of the first through fourth generations, and a camera body 2 corresponding to one of the first through fourth generations, used in combination. FIG. 7 indicates the generations each representing the communication specification supported in hotline communication carried out by a specific combination of a camera body 2 and an interchangeable lens 3, with generations pertaining to the camera body 2 indicated along the horizontal axis and generations pertaining to the interchangeable lens 3 indicated along the vertical axis.

As explained below, it is preferable to carry out hotline communication in conformance to the communication specifications designated as the highest-order generation (the generation bearing the highest number, the most advanced generation, or the highest grade) that can be assumed in a given combination of an interchangeable lens 3 and a camera body 2. However, hotline communication may be carried out in conformance to the communication specifications designated as a lower-order generation instead of the highest-order generation.

When a first-generation interchangeable lens 3 is mounted at a camera body 2 corresponding to any generation among the first through fourth generations, hotline communication will be carried out in conformance to the communication specifications designated as the first generation.

When a second-generation interchangeable lens 3 is mounted at a camera body 2 corresponding to any of the first through fourth generations, hotline communication will be carried out in conformance to the communication specifications designated as the first generation provided that the second-generation interchangeable lens 3 is mounted at a first-generation camera body 2, and hotline communication will be carried out in conformance to the communication specifications designated as the second generation provided that the second-generation interchangeable lens 3 is mounted at a camera body 2 corresponding to any generation among the second through fourth generations.

Hotline communication will be carried out as described below when a third-generation interchangeable lens 3 is mounted at a camera body 2 corresponding to a generation among the first through fourth generations. The third-generation interchangeable lens 3 will carry out hotline communication with a first-generation camera body 2 in conformance to the communication specifications designated as the first generation, will carry out hotline communication with a second-generation camera body 2 in conformance to the communication specifications designated as the second generation and will carry out hotline communication with a camera body 2 corresponding to the third generation or the fourth generation in conformance to the communication specifications designated as the third generation. It is to be noted that the third-generation interchangeable lens 3 may engage in communication with a second-generation camera body 2 in conformance to the communication specifications designated as the first generation, i.e., a lower-order generation (a generation bearing a lower number, a preceding generation) instead of the communication specifications designated as the highest-order generation (the generation bearing the highest number, the most advanced generation, the highest grade), and may engage in communication with a third-generation camera body 2 or a fourth-generation camera body 2 in conformance to the communication specifications designated as the first generation or the second generation.

Hotline communication will be carried out as described below when a fourth-generation interchangeable lens 3 is mounted at a camera body 2 corresponding to a generation among the first through fourth generations. The fourth-generation interchangeable lens 3 will carry out hotline communication with a first-generation camera body 2 in conformance to the communication specifications designated as the first generation, and will carry out hotline communication with a second-generation camera body 2 in conformance to the communication specifications designated as the second generation. In addition, the fourth-generation interchangeable lens 3 will carry out hotline communication with a third-generation camera body 2 in conformance to the communication specifications designated as the third generation, and will carry out hotline communication with a fourth-generation camera body 2 in conformance to the communication specifications designated as the fourth generation.

It is to be noted that the fourth-generation interchangeable lens 3 may engage in communication with a second-generation camera body 2 in conformance to the communication specifications designated as the first generation, and may engage in communication with a third-generation camera body 2 in conformance to the communication specification represented by the first generation or the second generation. Furthermore, it may engage in communication with a fourth-generation camera body 2 in conformance to the communication specifications designated as the first generation, the second generation or the third generation.

Next, generation information transmitted from the interchangeable lens 3 to the camera body 2 and generation information transmitted from the camera body 2 to the interchangeable lens 3 through command data communication will be explained. In command data communication, data expressing lens-side generation information "1", "2", "3" or "4" are transmitted from the interchangeable lens 3 to the camera body 2. The lens-side generation information "1", "2", "3" or "4" indicates that the interchangeable lens 3 is a first-generation, second-generation, third-generation or fourth-generation interchangeable lens.

It is to be noted that lens-side generation information specifying the first generation indicates that the interchangeable lens 3 supports the communication specifications designated as the first generation. Likewise, lens-side generation information specifying the second generation indicates that the interchangeable lens 3 supports both the communication specifications designated as the first generation and the communication specifications designated as the second generation. Lens-side generation information specifying the third generation indicates that the interchangeable lens 3 supports the communication specifications designated as any of three generations, i.e., the first generation, the second generation and the third generation, whereas lens-side generation information specifying the fourth generation indicates that the interchangeable lens 3 supports the communication specifications designated as any of four generations, i.e., the first generation, the second generation, the third generation and the fourth generation.

In addition, as will be explained later, the generation information transmitted from the camera body 2 to the interchangeable lens 3 specifies a generation, which is determined at the camera body 2 based upon the lens-side generation information and body-side generation information, representing the communication specifications in conformance to which hotline communication is to be carried out by the camera body 2 and the interchangeable lens 3 mounted at the camera body 2. In command data communication, generation information "1" "2", "3" or "4" is transmitted from the camera body 2 to the interchangeable lens 3. The generation information "1" "2", "3" or "4" indicates that hotline communication is to be carried out in conformance to the communication specifications designated as the first generation, the second generation, the third generation or the fourth generation.

For instance, second-generation information (second generation) may be transmitted from an interchangeable lens 3 supporting up to the second-generation communication specifications to a camera body 2 supporting up to the second-generation communication specifications. In such a case, since the camera body 2 supports the communication specifications designated as the matching generation (second generation), information indicating the second generation, i.e., the highest-order generation, is transmitted to the interchangeable lens 3. By transmitting the matching generation information (second generation) to the interchangeable lens 3, the camera body 2 is issuing a request to the interchangeable lens 3 that communication be carried out in conformance to the communication specifications represented by the matching generation (second generation).

In addition, an interchangeable lens 3 supporting up to the third generation communication specifications may be mounted at a camera body 2 supporting higher-order generation communication specifications, i.e., the fourth-generation communication specifications. In this case, generation information indicating the third generation is transmitted from the interchangeable lens 3 to the camera body 2 and the camera body 2, in turn, transmits generation information indicating the highest-order generation supported commonly by the camera body 2 and the interchangeable lens 3, i.e., generation information indicating the third information, which is a lower generation (lower-order generation) than the generation that the camera body 2 is capable of supporting (fourth generation). The generation information indicating the lower-order generation (third generation) transmitted from the camera body 2 constitutes a request to the interchangeable lens 3 that hotline communication be carried out in conformance to the communication specifications designated as the third generation, which is the highest-order generation supported by the interchangeable lens 3.

Furthermore, if an interchangeable lens 3 supporting up to, for instance, the fourth-generation communication specifications is mounted at a third-generation camera body 2, i.e., a lower-order camera body 2, generation information specifying the fourth generation is transmitted from the interchangeable lens 3 to the camera body 2. However, the camera body 2, which does not support the fourth-generation communication specifications, transmits generation information specifying the third generation, i.e., the highest generation it is able to support, to the interchangeable lens 3. The generation information transmitted from the camera body 2, specifying a lower-order generation (third generation) relative to the communication specifications the interchangeable lens 3 is able to support, constitutes a request to the interchangeable lens 3 that hotline communication be carried out in conformance to the communication specifications designated as the third generation, which is the highest generation that can be supported by the camera body 2.

As described above, a given generation represents a set of communication specifications different from other sets of communication specifications. The communication specifications include at least one item related to communication, which may be, for instance, the communication speed at which hotline communication is carried out, the communication interval at which hotline communication is carried out or the number of sets of data transmitted through hotline communication. Generation information specifies communication specifications in conformance to which the interchangeable lens and the camera body are able to carry out communication through hotline communication.

A method adopted when determining a generation representing the communication specifications in conformance to which hotline communication is to be carried out between the interchangeable lens 3 and the camera body 2 will be explained below in specific terms.

As the interchangeable lens 3 is mounted at the camera body 2, initialization communication between the interchangeable lens 3 and the camera body 2 is started through command data communication. As a command requesting that the lens-side generation information be transmitted is transmitted from the camera body 2 to the interchangeable lens 3 through the initialization communication, the first lens communication unit 38 transmits the lens-side generation information stored in the lens memory 36 to the first body communication unit 28 through command data communication. The body control unit 27 obtains the generation information pertaining to the mounted interchangeable lens 3 via the first body communication unit 28 and ascertains the generation representing the communication specifications that can be supported by the interchangeable lens 3. For instance, the generation information pertaining to the interchangeable lens 3 may indicate "3" specifying the third generation, and in such a case, the body control unit 27 ascertains that the interchangeable lens 3 is capable of carrying out hotline communication according to the communication specifications designated as the first generation, the second generation and the third generation.

The body control unit 27 then determines, based upon the lens-side generation information and the body-side generation information, the generation representing the communication specifications in conformance to which hotline communication is to be carried out, as described below. Namely, the highest-order generation among the generations representing communication specifications that can be commonly supported by both the interchangeable lens 3 and the camera body 2 is selected as the generation of communication specifications in conformance to which hotline communication is to be carried out. For instance, if the lens-side generation information transmitted from the interchangeable lens 3 indicates "3", i.e., if the interchangeable lens 3 is capable of carrying out communication through hotline communication in conformance to the communication specifications designated as the first generation, the second generation and the third generation as described above and the body-side generation specifies "4" representing the fourth generation, the camera body 2 is able to carry out communication through hotline communication in conformance to the communication specifications designated as the first generation, the second generation, the third-generation and the fourth-generation and accordingly, the third generation, which is the highest-order generation among the generations commonly supported by both the interchangeable lens 3 and the camera body 2 will be selected.

As explained above, the body control unit 27 selects the highest-order generation among the generations representing communication specifications that can be commonly supported by both the interchangeable lens 3 and the camera body 2, as indicated in FIG. 7. The body control unit 27 then transmits generation information specifying the selected generation to the first lens communication unit 38 via the first body communication unit 28. In addition, the body control unit 27 controls (sets) various components located at the camera body 2 in correspondence to the communication specifications designated as the selected generation. As a result, the camera body 2 becomes able to execute hotline communication with the interchangeable lens 3 mounted thereat in conformance to the communication specifications designated as the selected generation.

Once a command and data, including the generation information indicating the generation of communication specifications for hotline communication, are transmitted from the camera body 2 to the interchangeable lens 3 through command data communication, hotline communication commences. More specifically, when the camera body 2 transmits a command for setting hotline communication to the interchangeable lens 3, the generation information is also transmitted as a data packet together with the command.

In order to start hotline communication, the lens control unit 37 sets and controls the various components of the interchangeable lens 3 so as to achieve a hotline communication-enabled state in conformance to the communication specifications indicated in the generation information specifying the generation selected by the camera body 2, i.e., indicated in the generation information obtained from the camera body 2 via the first lens communication unit 38. As a result, the interchangeable lens 3 becomes able to execute hotline communication with the camera body 2 in conformance to the communication specifications designated as the generation selected by the camera body 2. Once a command for setting hotline communication and generation information specifying the first generation or higher are transmitted from the camera body 2 to the interchangeable lens 3 as described above, the interchangeable lens 3 initiates hotline communication. Namely, hotline communication commences as the command for setting hotline communication and the generation information (a value indicating generation information) specifying the communication specifications for hotline communication are transmitted from the camera body 2 to the interchangeable lens 3.

It is to be noted that the body control unit 27 may select a set of communication specifications different from the communication specifications designated as the highest-order generation among the generations of communication specifications commonly supported by the interchangeable lens 3 and the camera body 2. For instance, the communication frequency of communication carried out according to the communication specifications designated as the highest-order generation may interfere with the drive frequency at the image sensor or the like, and in such a case, communication may be carried out in conformance to communication specifications designated as a lower-order generation so as to prevent such interference.

In the embodiment described above, the interchangeable lens 3 transmits lens-side generation information specifying a generation representing a set of communication specifications that include items such as the communication speed and the communication interval, to the camera body 2. The camera body 2, having received the lens-side generation information, is able to ascertain the communication specifications (the communication speed and the like) that can be supported by the interchangeable lens 3. Since the lens-side generation information transmitted from the interchangeable lens 3 to the camera body 2 amounts to a smaller volume of data compared to the volume of data that would need to be transmitted from the interchangeable lens 3 to the camera body 2 to notify the camera body 2 of the communication speed, the communication interval and the like that can be supported by the interchangeable lens 3 individually through a plurality of communication sessions, the duration of communication and the number of communication sessions can both be reduced. In addition, if the communication speed, the communication interval and the like that can be supported by the interchangeable lens 3 were individually transmitted from the interchangeable lens 3 to the camera body 2, the camera body 2 would need to verify whether or not there were any inconsistencies in the communication speed, the communication interval and the like transmitted from the interchangeable lens 3. In the embodiment, each generation (generation information) represents a set of communication specifications (communication speed, communication interval and the like) with no inconsistencies, thereby eliminating the need for the body control unit 27 to check for any inconsistency in the communication speed, the communication interval and the like received from the interchangeable lens 3.

While an explanation has been given in reference to an example in which generation information specifies the first generation, the second generation, the third generation or the fourth generation, the present invention is not limited to this example and generation information may specify a fifth or higher-order generation.

In the example explained in reference to FIG. 7, an interchangeable lens 3 corresponding to a given generation is able to carry out hotline communication in conformance to the communication specifications designated as a preceding generation (a generation bearing a smaller number/lower grade), as well. In the example to be described next, the interchangeable lens 3 is able to carry out hotline communication only according to the communication specifications corresponding to a single generation and does not support hotline communication according to the communication specifications designated as a preceding generation (a generation bearing a smaller number/lower grade).

FIG. 8 presents a chart indicating generations each representing the communication specifications in conformance to which hotline communication is carried out between an interchangeable lens 3, capable of carrying out hotline communication in conformance to the communication specifications corresponding to a single generation among the first through fourth generations, and a camera body 2 corresponding to a generation among the first through fourth generations. The camera body 2 is able to carry out hotline communication in conformance to the communication specifications designated as a preceding generation (a generation bearing a smaller number/lower grade), too, as in the example described in reference to FIG. 7.

FIG. 8 presents a chart indicating generations each representing the communication specifications supported in hotline communication carried out by a specific combination of a camera body 2 and an interchangeable lens 3, with generations pertaining to the camera body 2 indicated along the horizontal axis and generations pertaining to the interchangeable lens 3 indicated along the vertical axis. Hotline communication carried out when an interchangeable lens 3 capable of carrying out hotline communication in conformance to the communication specifications designated as the first generation alone is mounted at the camera body 2 corresponding to a certain generation will be explained first. When the interchangeable lens 3 capable of carrying out hotline communication in conformance to the communication specifications designated as the first generation alone is mounted at a first-generation camera body 2, the first lens communication unit 38 transmits lens-side generation information "1" to the first body communication unit 28 through command data communication executed as the initial communication. The body control unit 27 receives the lens-side generation information "1" having been transmitted via the first body communication unit 28. The body control unit 27 at the first-generation camera body 2 selects the first generation, i.e., the highest-order generation among generations commonly supported by the interchangeable lens 3 and the camera body 2, as the generation representing the communication specifications for hotline communication. The body control unit 27 then transmits generation information specifying the selected first generation to the first lens communication unit 38 via the first body communication unit 28. Subsequently, hotline communication is carried out between the interchangeable lens 3 and the camera body 2 in conformance to the communication specifications designated as the first generation.

When the interchangeable lens 3, capable of communicating through hotline communication in conformance to the communication specifications designated as the first generation only is mounted at a second-generation, third-generation or fourth-generation camera body 2, the first generation, which is the highest-order generation among generations of communication specifications commonly supported by the interchangeable lens 3 and the camera body 2, is selected as the generation representing the communication specifications for hotline communication based upon data exchanged between the interchangeable lens 3 and the camera body 2 through command data communication as described above, and hotline communication is carried out between the interchangeable lens 3 and the camera body 2 in conformance to the communication specifications designated as the first generation.

Next, hotline communication carried out when an interchangeable lens 3 capable of carrying out hotline communication in conformance to the communication specifications designated as the second generation alone is mounted at the camera body 2 corresponding to a certain generation will be explained. When the interchangeable lens 3 capable of carrying out hotline communication in conformance to the communication specifications designated as the second generation alone is mounted at a second-generation camera body 2, the first lens communication unit 38 transmits lens-side generation information "2" to the first body communication unit 28 through command data communication executed as the initial communication. The body control unit 27 receives the lens-side generation information "2" having been transmitted via the first body communication unit 28. The body control unit 27 at the second-generation camera body 2 selects the second generation, i.e., the highest-order generation among generations commonly supported by the interchangeable lens 3 and the camera body 2, as the generation representing the communication specifications for hotline communication. The body control unit 27 then transmits generation information specifying the selected second generation to the first lens communication unit 38 via the first body communication unit 28. Subsequently, hotline communication is carried out between the interchangeable lens 3 and the camera body 2 in conformance to the communication specifications designated as the second generation.

When the interchangeable lens 3, capable of communicating through hotline communication in conformance to the communication specifications designated as the second generation only, is mounted at a third-generation or a fourth-generation camera body 2, the second generation, which is the highest-order generation among generations of communication specifications commonly supported by the interchangeable lens 3 and the camera body 2, is selected as the generation representing the communication specifications for hotline communication based upon data exchanged between the interchangeable lens 3 and the camera body 2 through command data communication as described above, and hotline communication is carried out between the interchangeable lens 3 and the camera body 2 in conformance to the communication specifications designated as the second generation.

If the interchangeable lens 3, capable of carrying out hotline communication only in conformance to the communication specifications designated as the second generation, is mounted at a first-generation camera body 2, no common generation of communication specifications is supported by both the interchangeable lens 3 and the camera body 2, and for this reason, hotline communication will not be carried out in a normal manner or hotline communication will not commence at all.

Next, hotline communication carried out when an interchangeable lens 3 capable of carrying out hotline communication in conformance to the communication specifications designated as the third generation alone is mounted at the camera body 2 corresponding to a certain generation will be explained. When the interchangeable lens 3 capable of carrying out hotline communication in conformance to the communication specifications designated as the third generation alone is mounted at a third-generation camera body 2, the first lens communication unit 38 transmits lens-side generation information "3" to the first body communication unit 28 through command data communication executed as the initial communication. The body control unit 27 receives the lens-side generation information "3" having been transmitted via the first body communication unit 28. The body control unit 27 at the third-generation camera body 2 selects the third generation, i.e., the highest-order generation among generations commonly supported by the interchangeable lens 3 and the camera body 2, as a generation representing the communication specifications for hotline communication. The body control unit 27 then transmits generation information specifying the selected third generation to the first lens communication unit 38 via the first body communication unit 28. Subsequently, hotline communication is carried out between the interchangeable lens 3 and the camera body 2 in conformance to the communication specifications designated as the third generation.

When the interchangeable lens 3, capable of communicating through hotline communication in conformance to the communication specifications designated as the third generation only, is mounted at a fourth-generation camera body 2, the third generation, which is the highest-order generation among generations of communication specifications commonly supported by the interchangeable lens 3 and the camera body 2, is selected as the generation representing the communication specifications for hotline communication based upon data exchanged between the interchangeable lens 3 and the camera body 2 through command data communication as described above, and hotline communication is carried out between the interchangeable lens 3 and the camera body 2 in conformance to the communication specifications designated as the third generation.

If the interchangeable lens 3, capable of carrying out hotline communication only in conformance to the communication specifications designated as the third generation, is mounted at a first generation or second-generation camera body 2, no common generation of communication specifications is supported by both the interchangeable lens 3 and the camera body 2, and for this reason, hotline communication will not be carried out in a normal manner or hotline communication will not commence at all.

Next, hotline communication carried out when an interchangeable lens 3 capable of carrying out hotline communication in conformance to the communication specifications designated as the fourth generation alone is mounted at the camera body 2 corresponding to a certain generation will be explained. When the interchangeable lens 3 capable of carrying out hotline communication in conformance to the communication specifications designated as the fourth generation alone is mounted at a fourth-generation camera body 2, the first lens communication unit 38 transmits lens-side generation information "4" to the first body communication unit 28 through command data communication executed as the initial communication. The body control unit 27 receives the lens-side generation information "4" having been transmitted via the first body communication unit 28. The body control unit 27 at the fourth-generation camera body 2 selects the fourth generation, i.e., the highest-order generation among generations commonly supported by the interchangeable lens 3 and the camera body 2, as a generation representing the communication specifications for hotline communication. The body control unit 27 then transmits generation information specifying the selected fourth generation to the first lens communication unit 38 via the first body communication unit 28. Subsequently, hotline communication is carried out between the interchangeable lens 3 and the camera body 2 in conformance to the communication specifications designated as the fourth generation.

If the interchangeable lens 3, capable of carrying out hotline communication only in conformance to the communication specifications designated as the fourth generation, is mounted at a first-generation, second-generation or third-generation camera body 2, no common generation of communication specifications is supported by both the interchangeable lens 3 and the camera body 2, and for this reason, hotline communication will not be carried out in a normal manner or hotline communication will not commence at all.

In addition, generation information may indicate a value "0". Generation information "0" will not be used to start communication by determining a certain generation of communication specifications in conformance to which hotline communication is to be carried out between a camera body 2 and an interchangeable lens 3, but instead will be used to indicate that hotline communication is not to be executed or to stop hotline communication having been started. Even in the case of a manual focus lens that does not support autofocus operation, a focus lens position may be transmitted to the camera body 2 through hotline communication, as long as the position of the manual focus lens can be detected. However, if the interchangeable lens 3 includes a manual focus lens without, for instance, a focus lens position detection means, it will not be necessary in the first place to transmit information indicating the focus lens position from the interchangeable lens 3 to the camera body 2 and thus, it will not be necessary to carry out hotline communication for transmitting the focus lens position information. When it is not necessary to transmit information other than the focus lens position information to the camera body 2, hotline communication does not need to be carried out between the interchangeable lens 3 and the camera body 2, either. Accordingly, if an interchangeable lens 3 that does not support hotline communication, i.e., an interchangeable lens 3 in conjunction with which hotline communication does not need to be executed, is mounted at the camera body 2, generation information indicating a value "0" is transmitted from the interchangeable lens 3 to the camera body 2. In response, the camera body 2 transmits a command for setting hotline communication together with a data packet carrying generation information specifying a value "0". The interchangeable lens 3, having received the data packet indicating "0" will not start hotline communication with the camera body 2.

Furthermore, the camera body 2 is able to end hotline communication by transmitting generation information indicating a value "0" to the interchangeable lens 3. After hotline communication between the camera body 2 and the interchangeable lens 3 is started, it may be terminated as power is turned off in response to an operation at a power switch at the camera body 2, as power is turned off following a non-operating state sustained over a predetermined length of time (may otherwise be referred to as a hibernating state or a sleep state), as an image reproduction mode is started or as a menu screen is brought up on display. When terminating hotline communication, a command for setting hotline communication and a data packet carrying generation information indicating a value "0" are transmitted from the camera body 2 to the interchangeable lens 3. The interchangeable lens 3, which starts hotline communication upon receiving generation information indicating a value among "1" through "4" from the camera body 2 through command data communication, ends hotline communication upon receiving generation information "0" from the camera body 2 through command data communication. It is to be noted that the generation information parameter does not need to specify a value "0" to indicate that communication is not to be started or that communication is to be stopped, and it may instead indicate another predefined value such as "99".

As described above, generation information may indicate a value (integer) equal to or greater than "0". As generation information indicating an integer equal to or greater than "1" is transmitted from the interchangeable lens 3 to the camera body 2, the camera body 2 selects a corresponding generation representing the communication specifications in conformance to which communication can be carried out by the camera body 2, and the interchangeable lens 3 starts hotline communication upon receiving generation information indicating a value equal to or greater than "1" determined by the camera body 2, together with a command for setting hotline communication.

In addition, if generation information indicating "0" is transmitted from the interchangeable lens 3 to the camera body 2, the camera body 2 recognizes the interchangeable lens 3 as an interchangeable lens that cannot be engaged in hotline communication and transmits generation information "0" to the interchangeable lens 3. The interchangeable lens 3 does not start hotline communication after receiving a command for setting hotline communication and the generation information "0" from the camera body 2. It is to be noted that the camera body 2, having received generation information indicating "0" from the interchangeable lens 3, does not need to transmit generation information "0" or a hotline communication setting command to the interchangeable lens 3.

Furthermore, once hotline communication starts after the interchangeable lens 3 receives a command for setting hotline communication and generation information indicating a value "1" or higher, which has been determined at the camera body 2, from the camera body 2, the interchangeable lens 3 stops the hotline communication upon receiving from the camera body 2 a hotline communication setting command and generation information "0".

As described above, the interchangeable lens 3 simply needs to receive from the camera body 2 a hotline communication setting command and generation information "0" when hotline communication is not to be executed or when hotline communication, currently underway, is to be stopped, without requiring a special command for stopping hotline communication. As a result, the number of commands can be reduced. In addition, since hotline communication can be started and stopped by using the same command, control can be simplified.

The generation information, which is transmitted from the camera body 2 to the interchangeable lens 3 following a hotline communication setting command, indicates that hotline communication is to start, that hotline communication is not to start or that hotline communication having started is to stop, as well as indicating the communication specifications in conformance to which hotline communication is to be carried out.

Figure 9:
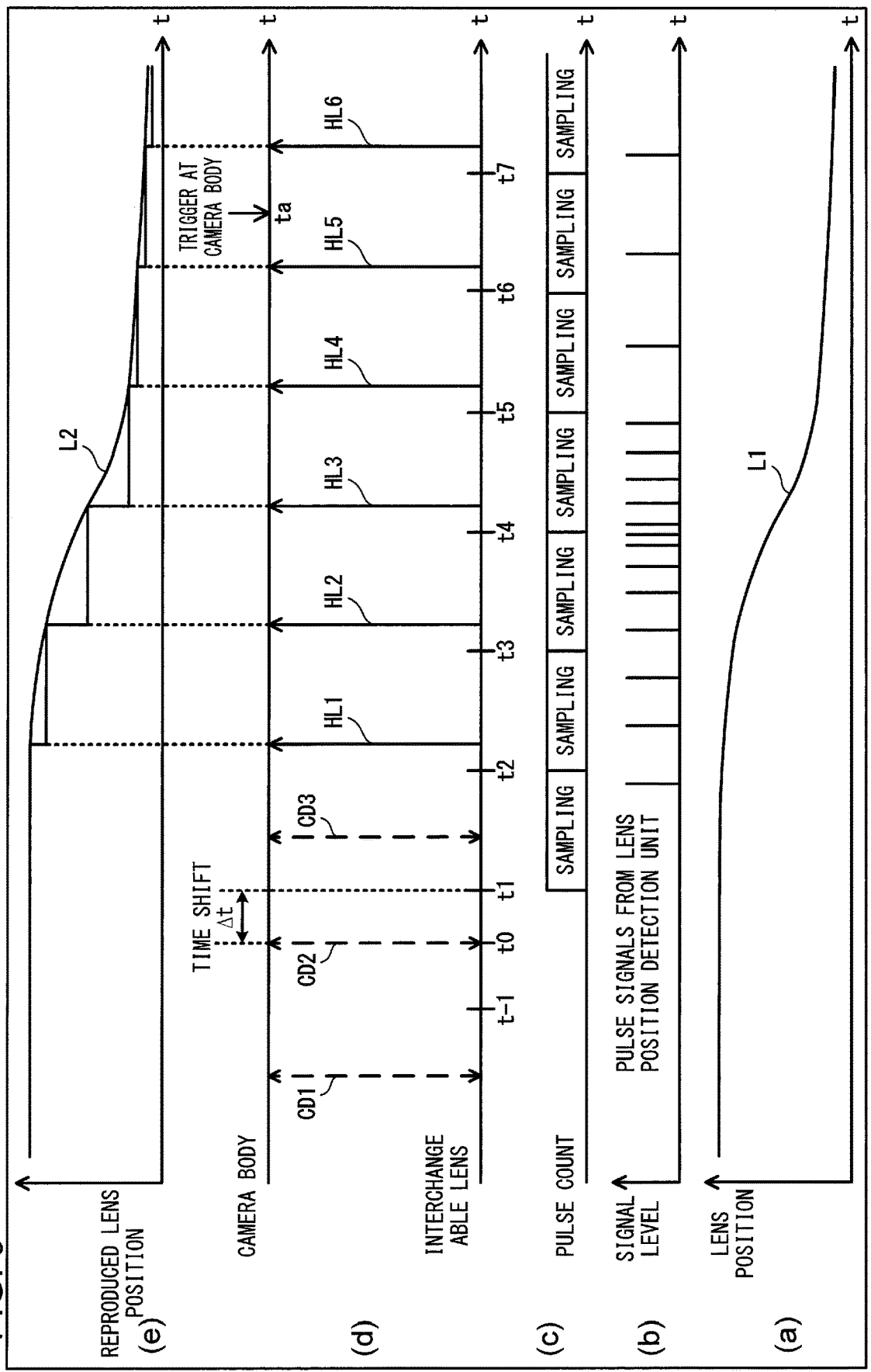
FIG. 9 shows charts presenting an example of processing and communication that may be executed in the camera in the first embodiment.

FIG. 9 shows charts presenting an example of hotline communication that may be carried out based upon generation information indicating a generation selected in the camera 1 constituting the image capturing device in the first embodiment. An explanation will be given in reference to FIG. 9 by assuming that the focus lens is driven as a drive target lens. In FIG. 9, a chart (a) schematically indicates a change occurring over time with respect to a position (L1) actually taken by the focus lens along the optical axis, a chart (b) indicates a pulse signal output from the encoder in the lens position detection unit 34 as the focus lens moves, a chart (c) indicates how the lens control unit 37 samples the pulse signals, a chart (d) indicates sessions of command data communication (CD 1 through CD 3) and hotline communication (HL 1 through HL 6) carried out between the camera body 2 and the interchangeable lens 3 and a chart (e) schematically indicates a change occurring over time in a focus lens position (L2) which is reconstructed at the camera body 2 based upon the cumulative value (pulse position information) of pulse signals received through the hotline communication. In FIG. 9, the charts (a) through (e) share a common horizontal axis along which time points are indicated.

A curve L1 in the chart (a) in FIG. 9 schematically indicates a change occurring over time with respect to the focus lens position with time points indicated along the horizontal axis and the position taken by the focus lens along the optical axis L indicated along the vertical axis. In FIG. 9, the chart (b) indicates a pulse signal output from the encoder in the lens position detection unit 34 explained earlier. The number of these pulse signals corresponds to the distance over which the focus lens has moved. A pulse signal is generated each time the focus lens is driven to move over a predetermined distance and thus, a greater number of pulse signals is generated when the position of the focus lens changes by a greater extent. This means that when the focus lens moves at a higher traveling speed, pulse signals are generated at higher frequency. The lens control unit 37 transmits focus lens pulse position information (indicating the focus lens position represented by the cumulative number of pulses) generated by adding up the pulse signals from the interchangeable lens 3 to the camera body 2 through each session of hotline communication. It is to be noted that the pulse signals indicated in the chart (b) may be pulse signals output from the drive circuit in the lens drive unit 33. A curve L2 in the chart (e) of FIG. 9 schematically indicates a change occurring over time with respect to the focus lens position reproduced at the camera body 2 based upon the pulse position information received through each session of hotline communication, with time points indicated along the horizontal axis and the position of the focus lens along the optical axis L indicated along the vertical axis.

It is to be noted that while command data communication and hotline communication are carried out through communication paths different from each other, as explained earlier, the chart (d) of FIG. 9 shows sessions of command data communication (CD1 through CD3) and sessions of hotline communication (HL 1 through HL 6) together. The command data communication sessions (CD1 through CD3) are each indicated with a dotted-line double-sided arrow, whereas the hotline communication sessions (HL1 through HL6) are each indicated with a solid-line arrow. Command data communication is bidirectional communication carried out between the camera body 2 and the interchangeable lens 3, whereas data are transmitted from the interchangeable lens 3 to the camera body 2 through hotline communication.

In a command data communication session CD1, the lens control unit 37 in the interchangeable lens 3 transmits the lens-side generation information of the interchangeable lens 3 to the first body communication unit 28 at the camera body 2 via the first lens communication unit 38. Once the lens-side generation information of the interchangeable lens 3 is received at the first body communication unit 28, the body control unit 27 at the camera body 2 selects a generation representing the communication specifications in conformance to which hotline communication is to be carried out, as explained earlier, based upon the lens-side generation information and the body-side generation information held in the camera body 2 itself.

In a command data communication session CD2, the first body communication unit 28 transmits a command packet requesting that hotline communication be set and a data packet to the first lens communication unit 38. This data packet carries generation information indicating the communication specifications determined by the body control unit 27. Once the command packet requesting hotline communication be set and the data packet are received at the first lens communication unit 38, the lens control unit 37 executes processing for setting and controlling the various components of the interchangeable lens 3 so as to enable communication to be carried out in conformance to the communication specifications indicated in the generation information carried in the data packet.

It is to be noted that through the command data communication session CD2, information corresponding to a time shift Δt, which will be explained later, is transmitted from the interchangeable lens 3 to the camera body 2.

As indicated in the chart (c) of FIG. 9, the lens control unit 37, having received the command packet requesting the hotline communication be set and the data packet (through the command data communication session CD2), starts sampling pulse signals output from the lens position detection unit 34 at a time point t1. The lens control unit 37 becomes able to generate pulse signal cumulative value information indicating the number of pulse signals sampled during a sampling period by sampling (counting) pulse signals. The second lens communication unit 39 shifts into a transmission-enabled state in which it is able to transmit the pulse signal cumulative value (pulse position information) indicating the number of pulse signals, which are counted from the origin position, and detected via a photo interrupter, to the camera body 2.

It is to be noted that pulse signal sampling may be started at a time point preceding the time point t1 so as to transmit the pulse position information to the camera body 2 at the time point t1 and onwards after carrying out CD2.

The first body communication unit 28 transmits a signal carrying a focus lens drive instruction (drive command) to the first lens communication unit 38 through a command data communication session CD3. The lens control unit 37 starts moving the focus lens based upon the drive command.

As indicated in the chart (c) of FIG. 9, the lens control unit 37 samples (counts) pulse signals output from the lens position detection unit 34 over the sampling interval stipulated in the sampling interval specifications designated as the generation having been determined. The lens control unit 37 first samples pulse signals output from the lens position detection unit 34 during a time period from the time point t1 through a time point t2 and generates pulse position information indicating a cumulative value for the number of sampled pulse signals. The lens control unit 37 subsequently samples pulse signals output from the lens position detection unit 34 over the sampling interval stipulated in the sampling interval specifications designated as the generation having been determined beyond the time point t2 as well. The lens control unit 37 continuously samples pulse signals until it receives generation information indicating "0" constituting an instruction for ending the hotline communication as explained earlier.

In a hotline communication session HL1, the second lens communication unit 39 transmits the pulse signal cumulative value (the pulse signal cumulative value is 1 in the example presented in FIG. 9), indicating the number of pulse signals having been sampled during the time period from the time point t1 through the time point t2 to the second body communication unit 29 as pulse position information.

In a hotline communication session HL2, the second lens communication unit 39 transmits, to the second body communication unit 29, pulse position information indicating the sum of pulses (the pulse sum is three in the example presented in FIG. 9), calculated by adding the cumulative value (two pulses in the example presented in FIG. 9) representing the number of pulse signals sampled during a time period from the time point t2 through a time point t3 to the cumulative value (one pulse in the example presented in FIG. 9) representing the number of pulses sampled during the time period from the time point t1 through the time point t2. In each hotline communication session among hotline communication sessions HL3, HL4, HL5, HL6 . . . , the second lens communication unit 39 transmits, to the second body communication unit 29, pulse position information indicating the pulse value representing the sum of pulses, calculated by adding the number of pulses sampled during a time period t3 through t4, t4 through t5, t5 through t6, t6 through t7 . . . , to the cumulative number of pulses representing the sum of pulses having been previously sampled.

It is to be noted that the individual sessions of hotline communication carried out via the second lens communication unit 39 and the second body communication unit 29 are executed at the communication speed and at the communication interval, both stipulated in the communication specifications designated as the generation selected by the body control unit 27, as explained earlier. The hotline communication is carried out at a communication speed of 2.5 MHz at a communication interval of 1 msec in the embodiment. Namely, information is transmitted from the lens control unit 37 to the body control unit 27 through sessions HL1, HL2, HL3, HL4, HL5, HL6 . . . , every msec in synchronization with a 2.5 MHz clock frequency.

As described above, the time period from the time point t1 through the time point t2, the time period from the time point t2 through the time point t3, the time period from the time point t3 to the time point t4, the time period from the time point t4 through the time point t5, the time period from the time point t5 through the time point t6, and the time period from the time point t6 through the time point t7 each match with the sampling interval stipulated in the sampling interval specifications designated as the selected generation.

In addition, the interval between the hotline communication sessions HL1 and HL2, the interval between the hotline communication sessions HL2 and HL3, the interval between the hotline communication sessions HL3 and HL4, the interval between the hotline communication sessions HL4 and HL5, and the interval between the hotline communication sessions HL5 and HL6 each match with the communication interval stipulated in the communication specifications designated as the generation having been selected. It is to be noted that the sampling interval and the communication interval are matching time interval in the embodiment. However, it will be obvious that the sampling interval may be a time interval different from the communication interval. For instance, the communication interval may be twice as long as the sampling interval.

The sets of pulse position information each indicating a cumulative number of pulse signals, repeatedly received at the second body communication unit 29 at the communication interval, are sequentially stored into the body memory 22 at the camera body 2. The pulse position information is transferred into the body memory 22 through, for instance, DMA (direct memory access). The body control unit 27 references the pulse position information stored in the body memory 22 with any timing (e.g., the timing with which a vertical synchronous signal is output at the image sensor at a time point to following the time point t6 and preceding the time point t7 in FIG. 9) and then calculates, through a method to be explained later, the time point (among the time points t2 through t6 on the interchangeable lens-side) at which each set of pulse position information has been generated at the interchangeable lens 3. The body control unit 27 associates each set of pulse position information with a generation time point at which the particular set of pulse position information has been generated so as to ascertain the positions taken by the focus lens at the individual time points, as indicated by the curve L2 in the chart (c) in FIG. 9. It is to be noted that instead of providing pulse position information indicating the cumulative number of pulse signals as position information repeatedly received at the second body communication unit 29 at the communication time interval, pulse signals sampled by the lens control unit 37 at the interchangeable lens 3 during each sampling cycle may be received at the second body communication unit 29 so as to enable the body control unit 27 to generate pulse position information by calculating the cumulative number of pulse signals.

Sets of pulse position information each corresponding to a generated time point may be used in, for instance, the phase detection AF mentioned earlier. In such a case, the body control unit 27 calculates a defocus quantity by using focus detection signals output from the image sensor 21, as explained earlier. The body control unit 27 then generates a signal carrying an instruction for focus lens drive based upon the defocus quantity thus calculated and outputs the drive instruction signal (drive command) having been generated to the lens control unit 37 through command data communication. The lens control unit 37 executes control for focus lens drive and also transmits pulse position information to the body control unit 27. The body control unit 27 ascertains the positions taken by the focus lens at the various time points based upon the pulse position information and determines the exact position to which the focus lens has moved relative to the focus lens traveling distance (defocus quantity) having been specified to the lens control unit 37.

Furthermore, the sets of pulse position information each corresponding to a certain generated time point may be used in contrast AF mentioned earlier. In such a case, based upon the generated time points at which the individual sets of pulse position information have been generated and generated time points at which signals, each used for purposes of contrast evaluation value calculation, have been generated at the image sensor 21, the body control unit 27 associates each set of pulse position information indicating a focus lens position with a contrast evaluation value. As a result, the body control unit 27 is able to ascertain the focus lens position and the contrast evaluation value corresponding to each time point. The body control unit 27 then calculates the focus lens pulse position at which a peak contrast evaluation value is achieved as an in-focus position. The body control unit 27 generates a signal carrying a focus lens drive instruction based upon the in-focus position thus calculated and outputs the drive instruction signal (drive command) thus generated to the lens control unit 37 through command data communication. The lens control unit 37 adjusts the focusing condition by executing drive control for moving the focus lens to the in-focus position.

An offset that may occur with respect to the lens position reproduced at the camera body 2 due to a shift in the clock timing at the camera body 2 relative to the clock timing at the interchangeable lens 3 will be explained next. The camera body 2 and the interchangeable lens 3 are engaged in operation on separate clocks. Namely, the camera body 2 generates a clock to be used within the camera body 2, whereas the interchangeable lens 3 generates its own clock to be used within the interchangeable lens 3. The frequency of the clock used within the camera body 2 and the frequency of the clock used within the interchangeable lens 3 may be matching frequencies or they may be frequencies different from each other. Assuming that the frequency of the clock generated in the camera body 2 is the same as the frequency of the clock generated in the interchangeable lens 3 and that the clock timing (the rise and the fall of the clock) of one clock is in complete synchronization with the clock timing of the other clock, the camera body 2 is able to accurately ascertain a generated time point at which a signal has been generated in the interchangeable lens 3. However, if the clock timing at the camera body 2, i.e., the clock frequency and the timing with which the clock rises/falls, is different from the clock timing in the interchangeable lens 3, the camera body 2 is not able to accurately ascertain a time point at which a signal has been generated at the interchangeable lens 3, resulting in a time shift occurring with respect to the actual lens position and the lens position reproduced at the camera body 2.

The following is an explanation of a method adopted in the camera body 2 to calculate a time point (among the time points t2 through t6 on the interchangeable lens-side) at which a set of pulse position information (a cumulative value of pulse signals) has been generated at the interchangeable lens 3 when the clock timing in the camera body 2 and the clock timing in the interchangeable lens 3 are different. As has been explained in reference to the charts (b) through (d) in FIG. 9, sets of pulse position information are generated as the lens control unit 37 samples pulse signals output from the lens position detection unit 34 or the lens drive unit 33 over a predetermined cycle. The lens control unit 37 samples pulse signals in response to a clock signal used within the interchangeable lens 3 (hereafter will be referred to as a lens clock signal). Namely, the time points t2, t3, t4, t5, t6, t7, . . . , at each of which a pulse signal is sampled and information indicating the cumulative value of pulse signals is generated in FIG. 9 are in synchronization with a rise or a fall of the lens clock signal. This lens clock signal is different from the CLK signal provided from the camera body 2.

The body control unit 27 ascertains a time point at which pulse signal sampling has started in reference to, for instance, the time point at which the command data communication session CD2 has been carried out for purposes of setting hotline communication. In order to enable the body control unit 27 to ascertain the time point at which the information indicating the cumulative value of pulse signals was generated at the lens control unit 37 relative to the time point at which the command data communication session CD2 was executed, the lens control unit 37 calculates the length of time having elapsed between the time point at which the command data communication session CD2 was executed and the time point t1 at which the pulse signal sampling started (the time shift Δt indicated in the chart (d) in FIG. 9) through a method to be explained later. The lens control unit 37 transmits information corresponding to the time shift Δt having been calculated to the camera body 2 through the command data communication session CD2.

The body control unit 27 at the camera body 2 obtains the information corresponding to the time shift Δt transmitted from the interchangeable lens 3 and calculates a time point at which the pulse position information, indicating the cumulative value of pulse signals, was generated relative to the time point of the data transmission through the command data communication CD2 by using the time shift Δt. The body control unit 27 thus calculates the pulse position information generated time point in reference to the transmission time point at which the command data communication CD2 was carried out.

Figure 10:
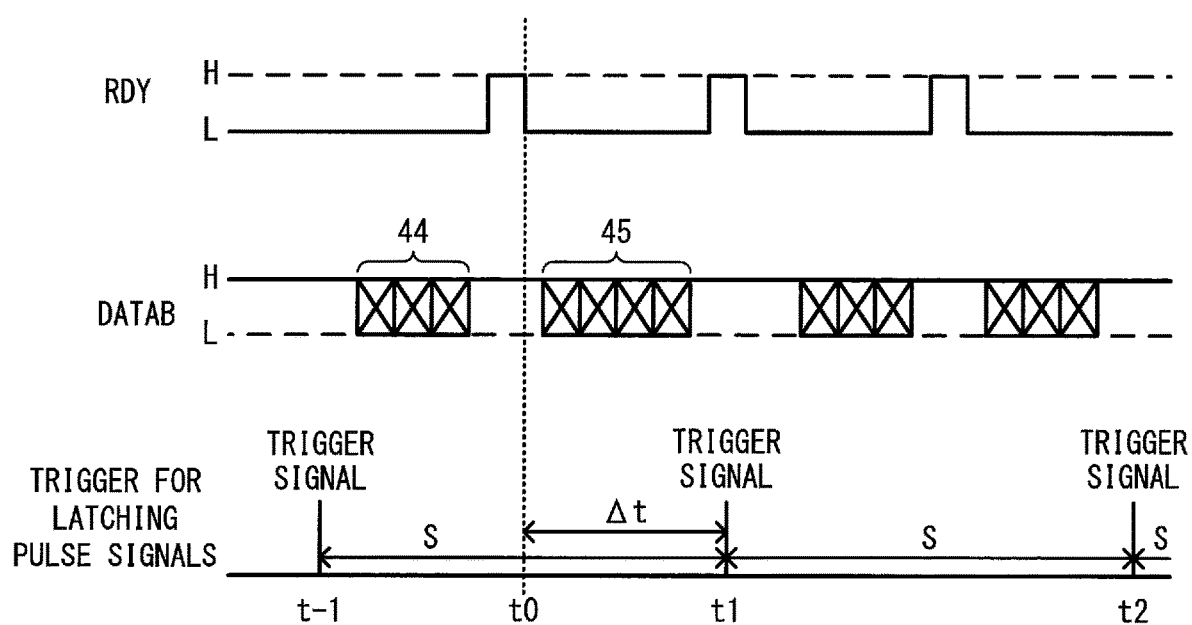
FIG. 10 is a diagram presenting an example of a method that may be adopted when calculating a time length $\Delta t$ in the camera in the first embodiment.

FIG. 10 is a chart in reference to which a method that may be adopted when calculating the time shift Δt in the image capturing device in the first embodiment will be explained. It is to be noted that at time point t−1, a time point t0, a time point t1 and a time point t2 in FIG. 10 respectively correspond to the time point t−1, the time point t0, the time point t1 and the time point t2 in FIG. 9. A command packet 44 and a data packet 45 are a command packet and a data packet transmitted from the camera body 2 to the interchangeable lens 3 through the command data communication session CD2 in FIG. 9. The command packet 44 carries a hotline communication setting instruction signal whereas the data packet 45 carries a signal that includes the generation information indicating the generation having been selected at the camera body 2.

Trigger signals used to latch pulse signals, indicated at the time points t−1, t1 and t2 in FIG. 10, are repeatedly generated at a predetermined cycle S based upon the lens clock signal output from the lens control unit 37 in the interchangeable lens 3. The predetermined cycle S matches the sampling interval in the chart (c) in FIG. 9, which is specified in the generation information as the sampling interval, as has been explained in reference to FIG. 6. The lens control unit 37 samples (latches) pulse signals output from the lens position detection unit 34 or the lens drive unit 33 over the sampling interval S by using the trigger signals.

A method that may be adopted when calculating the time shift Δt will be described next. The following explanation will be given on the premise that once the interchangeable lens 3 is mounted at the camera body 2 and power supply from the camera body 2 starts, the lens control unit 37 starts latching pulse signals over the sampling interval S stipulated in the specifications it is capable of supporting. FIG. 10 shows processing executed over a span of time including and following the latching time point t−1 immediately before the command data communication session CD2 starts. After setting the RDY signal to high level upon receiving the command packet 44 normally through the command data communication CD2, the lens control unit 37 switches the RDY signal to low level at the time point t0. The lens control unit 37 detects the length of time elapsing between the time point t−1 and the time point t0 and calculates the time shift Δt by subtracting the length of time elapsing between the time point t−1 and the time point t0 from the cycle S spanning from the time point t−1 through the time point t1. In more specific terms, the lens control unit 37 counts, via a built-in counter circuit or the like, lens clock signals over the period of time between the time point t−1 to a falling edge of the RDY signal so as to detect the length of time elapsing between the time point t−1 and the time point t0. The lens control unit 37 then outputs information indicating the time shift Δt to the body control unit 27 through the command data communication CD2.

In addition, upon receiving the data packet 45, the lens control unit 37 shifts the RDY signal from low level to high level. The lens control unit 37 also starts hotline communication in conformance to the communication specifications designated as the generation having been selected at the camera body 2, as indicated in the generation information carried in the data packet 45, as explained earlier. The lens control unit 37 further generates trigger signals at the sampling interval S as stipulated in the sampling interval specifications designated as the generation having been selected so as to engage in pulse signal sampling processing (see FIG. 9). The lens control unit 37 counts pulse signals from the lens position detection unit 34 or the lens drive unit 33 generated during the cycle S spanning from the time point t1 to the time point t2. Information indicating the number of sampled pulse signals is transmitted from the interchangeable lens 3 to the camera body 2 through the hotline communication session HL1 in FIG. 9.

The body control unit 27 obtains the information indicating the time shift Δt from the lens control unit 37 through the command data communication CD2. The body control unit 27 calculates the pulse position information generated time point, i.e., the time point at which pulse signals output from the encoder in the lens position detection unit 34 or the lens drive unit 33 have been sampled, based upon the time shift Δt and the sampling interval S. For instance, the body control unit 27 may calculate (determine) the pulse position information generated time point t2 as a time point t0+Δt+S by adding the time shift Δt and the sampling interval S to the RDY signal fall time point t0. In addition, the body control unit 27 calculates pulse position information generated time points t3, t4, t5 and t6 respectively as; t2+S, t2+2S, t2+3S and t2+4S.

The camera body 2 in the embodiment obtains the time shift Δt pertaining to a time point at which pulse position information, indicating the cumulative number of pulse signals, is generated and generates through calculation focus lens position information by using the time shift Δt. As a result, the extent of temporal delay occurring with respect to the focus lens position reproduced through calculation at the camera body 2 and the actual position of the focus lens at the interchangeable lens 3, can be reduced. The following is an explanation of this reduction in the temporal delay (cancellation of the time shift Δt causing the delay) between the reproduced focus lens position and the actual focus lens position, given by contrasting it with a comparison example.

In the comparison example, a focus lens position is calculated without ascertaining an accurate time shift Δt. Since the accurate time shift Δt is not provided by the lens control unit 37, the body control unit 27 calculates a lens position information generated time point by using a fixed value as an equivalent to the time shift instead. However, since the lens position information is generated by using trigger signals (signals generated based upon the lens clock signal used within the interchangeable lens 3) which are asynchronous with respect to the clock signal (CLK signal) provided from the camera body 2, the time shift is bound to change in correspondence to the timing with which the hotline communication setting instruction command is transmitted from the camera body 2 (the timing with which the RDY signal falls in the embodiment described in reference to FIG. 10). As a result, the use of the fixed value as an equivalent the time shift is bound to cause an error when setting sets of pulse position information in correspondence to individual pulse position information generated time points, which, in turn, is bound to result in a difference between the actual focus lens position and the calculated focus lens position. It is to be noted that a clock signal for hotline communication (HCLK signal), generated based upon the lens clock signal, is output from the interchangeable lens 3 to the camera body 2.

In the embodiment, in which the focus lens position is reproduced by using the time shift Δt representing the difference between the timing with which the command signal is transmitted and the timing with which the lens control unit 37 actually measures (samples) pulse signals, the extent of temporal offset with respect to the reproduced focus lens position and the actual focus lens position is reduced. As a result, the occurrence of an error that could otherwise occur when, for instance, determining a focus lens position to be designated as the in-focus position through autofocus can be prevented.

The following advantageous operations are achieved through the embodiment described above.

(1) Generation information indicating the communication specifications for hotline communication is transmitted from the interchangeable lens 3 to the camera body 2 through command data communication. Thus, the camera body 2 is able to ascertain the communication specifications (including the communication speed) that can be supported by the interchangeable lens 3 by referencing the generation information transmitted from the interchangeable lens 3 through command data communication. As a result, optimal communication can be carried out between the camera body 2 and the interchangeable lens 3. In addition, since the data transmitted through hotline communication, such as information pertaining to focus lens drive (information related to the focus lens position and the like) and information pertaining to anti-vibration lens drive (information related to the anti-vibration lens position and the like) as well as the data indicating the communication speed and the communication interval, are not separately and individually transmitted from the interchangeable lens 3 to the camera body 2, the volume of data transmitted from the interchangeable lens 3 to the camera body 2 can be reduced and furthermore, the length of communication time and the number of communication sessions required to determine a set of communication specifications through communication between the interchangeable lens 3 and the camera body 2 can be reduced. The number of values indicated in the generation information is smaller than the number of all the combinations of sets of communication specifications or data that may be indicated in the generation information. Moreover, if the individual communication specification items (the communication speed, the communication interval and the like) and sampling interval specification items indicated in the generation information in the embodiment were separately transmitted from the interchangeable lens 3 to the camera body 2, the camera body 2 would need to check and verify to ensure that there were no inconsistencies among the individual sets of information. In the embodiment, a set of communication specifications (the communication speed, the communication interval and the like) and a set of sampling interval specifications achieving consistency are set and generation information indicating these specifications is stored. Thus, the camera body 2, having received the generation information, is not required to check the specifications to ensure that there is no inconsistency.

In addition, the interchangeable lens 3 transmits, to the camera body 2, information (lens position information) pertaining to a drive target member (e.g., the focus lens), generated by a generating unit (lens control unit 37), through hotline communication executed in conformance to the communication specifications designated as the generation selected by the camera body 2. This means that the position information with respect to a drive target member such as the focus lens can be transmitted at high speed from the interchangeable lens 3 to the camera body 2 through hotline communication, which, in turn, makes faster autofocus operation possible.

(2) The interchangeable lens 3 includes the lens control unit 37 that repeatedly generates information (lens pulse position information) pertaining to a drive target member (such as the focus lens), transmits the information to the camera body 2, calculates a time shift $\Delta t$ elapsing from a time point at which a communication start instruction signal from the camera body 2 is received through a time point at which information pertaining to the drive target member is generated at the lens control unit 37 and transmits information indicating the time shift $\Delta t$ to the camera body 2. Thus, the camera body 2 is able to ascertain positions taken by the focus lens at various time points based upon the lens pulse position information and the time shift $\Delta t$. Moreover, the camera body 2 in the embodiment reproduces/generates a focus lens position based upon the time shift $\Delta t$. Consequently, deviation of the focus lens position reproduced at the camera body 2 relative to the actual focus lens position at the interchangeable lens 3 can be reduced.

(3) The CLK terminal is disposed at a position set apart from the VBAT terminal by a greater distance compared to the GND terminal. In addition, the PGND terminal is disposed between the GND terminal and the VBAT terminal. This makes it possible to shield the CLK terminal, through which a clock signal used in command data communication is transmitted, from noise originating at the VBAT terminal. As a result, the command data communication can be carried out in a stable manner. Consequently, generation information can be transmitted/received between the camera body 2 and the interchangeable lens 3 in a reliable manner.

The following variations are also within the scope of the present invention, and one of the variations or a plurality of variations may be adopted in combination with the embodiment described above.

Variation 1

In the embodiment described above, full duplex communication is executed as the command data communication carried out via the first lens communication unit 38 and the first body communication unit 28. As an alternative, half duplex communication may be executed as the command data communication carried out between the first lens communication unit 38 and the first body communication unit 28.

Variation 2

In the embodiment described above, the lens control unit 37 calculates the time from the time point t0 through the time point t1 in FIG. 10 as a time shift $\Delta t$ and the body control unit 27 calculates a lens position information generated time point based upon the time shift $\Delta t$ calculated by the lens control unit 37. Instead, the lens control unit 37 may calculate the length of time elapsing from the time point t0 to the time point t2 in FIG. 10 (i.e., a time shift $\Delta t2$) and output the time shift $\Delta t2$ to the camera body 2. In such a case, the body control unit 27 will calculate a lens position information generated time point by using the time shift $\Delta t2$.

For instance, the body control unit 27 will calculate (determine) a lens position information generated time point t2 as a time point t0+$\Delta t2$ by adding the time shift $\Delta t2$ to the RDY signal fall time point t0. The body control unit 27 will also calculate lens position information generation time points t3, t4, t5 and t6 respectively as t2+S, t2+2S, t2+3S and t2+4S Variation 3

While the lens control unit 37 in the embodiment described above includes the first lens communication unit 38 and the second lens communication unit 39, it does not need to include two separate communication units and may instead carry out communication via a single lens communication unit. While the body control unit 27 includes the first body communication unit 28 and the second body communication unit 29, it does not need to include two separate communication units and may instead carry out communication via a single body communication unit.

Variation 4

While an interchangeable lens is mounted as a camera accessory in the embodiment described above, an accessory other than an interchangeable lens may be mounted. The accessory may be, for instance, a tele-converter, a wide-angle converter or a close-up ring mounted between the camera body and an interchangeable lens, which is used to adjust the focal length of the interchangeable lens. The present invention may be further adopted in conjunction with, for instance, a mount adapter that allows an accessory such as an interchangeable lens compatible with a mount standard different from the camera body mount standard to be mounted. Namely, the present invention may be adopted in much the same way in conjunction with any accessory that is mounted at the camera body mount. An accessory-side terminal group, accessory-side projecting portions, accessory-side communication units and the like of such an accessory will be equivalent to the lens-side terminal group, the lens-side claw portions 139, the first and second lens communication units 38 and 39 and the like respectively.

While the embodiment has been described in reference to an accessory that can be mounted at a camera body, the present invention may be adopted in conjunction with a mount adapter instead of a camera body, that allows an interchangeable lens compatible with the mount standard described above to be mounted at a camera body that is not compatible with the mount standard by mounting the accessory via the mount adapter.

Variation 5

The interchangeable lens 3 in the embodiment described above transmits information to the camera body 2 over the communication interval indicated in the communication specifications designated as the generation having been selected. However, the interchangeable lens 3 does not always need to transmit data over the communication interval stipulated in the communication specifications designated as the selected generation. The interchangeable lens 3 may instead transmit data over a communication interval that is an integer multiple of the communication interval stipulated in the communication specifications designated as the selected generation, e.g., twice the communication interval stipulated in the communication specifications designated as the selected generation. In such a case, the camera body 2 will be able to receive all the data transmitted from the interchangeable lens 3 over an interval twice as long as the communication interval stipulated in the communication specifications designated as the selected generation. However, it will be obvious that data having been generated may be transmitted on an irregular basis instead of over the communication interval twice the length of the stipulated communication interval or over any cycle, as long as the data are synchronized with the communication interval stipulated in the communication specifications designated as the selected generation. Moreover, the interchangeable lens 3 may transmit data over a communication interval three times the length of the communication interval stipulated in the communication specifications designated as the selected generation.

While an embodiment and variations thereof have been described above, the present invention is in no way limited to the particulars of these examples. The embodiment and any of the variations may be adopted in combination. Furthermore, any other mode conceivable within the scope of the technical teachings of the present invention is also within the scope of the present invention.

REFERENCE SIGNS LIST

1 . . . camera (camera system), 2 . . . camera body, 3 . . . interchangeable lens, 27 . . . body control unit, 28 . . . first body communication unit, 29 . . . second body communication unit, 37 . . . lens control unit, 38 . . . first lens communication unit, 39 . . . second lens communication unit

The invention claimed is:

1. A camera body to which an accessory is mountable, the camera body comprising:
 a first communicator that transmits a first clock signal to the accessory to communicate with the accessory in synchronization with the first clock signal; and
 a second communicator that receives a second clock signal output from the accessory to communicate with the accessory in synchronization with the second clock signal,
 wherein a value specifying a communication specification of the second communicator is transmitted between the first communicator and the accessory.

2. The camera body according to claim 1, wherein the communication specification specified by the value includes frequency of the second clock signal output from the accessory.

3. The camera body according to claim 1, wherein
 the second communicator is capable of receiving position information of a movable member provided in the accessory, and
 the communication specification specified by the value includes a type of the movable member.

4. The camera body according to claim 1, wherein
 the second communicator receives data from the accessory in a periodical communication, and
 the communication specification specified by the value includes a communication interval in the periodical communication and a sampling interval that the accessory periodically obtains a position of a movable member provided in the accessory.

5. The camera body according to claim 1, wherein, after receiving a first value from the accessory, the first communicator transmits a second value to the accessory, the first value specifying a communication specification of the second communicator, the second value being equal to or lower than the first value.

6. The camera body according to claim 5, wherein, after the first communicator transmits the second value to the accessory, the second communicator starts receiving data repeatedly at a predetermined cycle specified by the second value.

7. A camera system that comprises an accessory and the camera body of claim 1.

8. An accessory mountable to a camera body, the accessory comprising:
 a movable member;
 a first communicator that receives a first clock signal output from the camera body to communicate with the camera body in synchronization with the first clock signal; and
 a second communicator that transmits a second clock signal to the camera body, wherein
 position information of the movable member is transmitted between the second communicator and the camera body in synchronization with the second clock signal, and
 a value specifying a communication specification of the second communicator is transmitted between the first communicator and the camera body.

9. The accessory according to claim 8, wherein the communication specification specified by the value includes frequency of the second clock signal.

10. The accessory according to claim 8, wherein
the second communicator is capable of transmitting position information of the movable member, and
the communication specification specified by the value includes a type of the movable member.

* * * * *